United States Patent
Tsutsui et al.

(10) Patent No.: US 6,314,391 B1
(45) Date of Patent: Nov. 6, 2001

(54) INFORMATION ENCODING METHOD AND APPARATUS, INFORMATION DECODING METHOD AND APPARATUS AND INFORMATION RECORDING MEDIUM

(75) Inventors: Kyoya Tsutsui; Osamu Shimoyoshi, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/025,593

(22) Filed: Feb. 18, 1998

(30) Foreign Application Priority Data

Feb. 26, 1997 (JP) .............................. P09-042514

(51) Int. Cl.[7] .............................. G10L 21/04; G10L 21/00
(52) U.S. Cl. .......................... 704/214; 704/201; 704/211
(58) Field of Search ................... 704/500, 501, 704/203, 204, 201, 211, 214

(56) References Cited

U.S. PATENT DOCUMENTS

| | | | |
|---|---|---|---|
| 5,592,584 | * 1/1997 | Ferreira et al. | 704/203 |
| 5,717,764 | * 2/1998 | Johnston et al. | 381/2 |
| 5,732,386 | * 3/1998 | Park et al. | 704/203 |
| 5,819,214 | 10/1998 | Suzuki et al. | 704/229 |
| 5,867,819 | * 2/1999 | Fukuchi et al. | 704/500 |

(List continued on next page.)

FOREIGN PATENT DOCUMENTS

| | | | |
|---|---|---|---|
| 4221321 A1 | 2/1993 | (DE) | G11B/20/10 |
| 4225434 A1 | 2/1993 | (DE) | G11B/20/10 |
| 3429901 C2 | 11/1993 | (DE) | H04N/7/13 |
| 4209544 C2 | 1/1994 | (DE) | H03M/7/30 |
| 4405659 C1 | 4/1995 | (DE) | H03M/7/30 |
| 4127592 C2 | 7/1995 | (DE) | G11B/20/10 |
| 19510226 C1 | 11/1996 | (DE) | H03M/7/30 |
| 19524688 C1 | 1/1997 | (DE) | H04N/7/26 |
| 00645769 | * 9/1994 | (EP) . | |
| 0 720 307 | * 7/1996 | (EP) . | |

OTHER PUBLICATIONS

Sinha et al "Audio compression at low bit rates using a signal adaptive switched filterbank" 1996, IEEE, 1053–1056.*

Iwadare et al "A 128 kb/s hi–fi audio CODEC based on adaptive transform coding with adaptive block size MCDT" 1992, IEEE, 138–1444.*

ATSC "Digital audio compression standard (AC–3)", Dec. 20, 1995, ATSC.*

R. E. Crochiere et al., "Digital Coding of Speech in Sub–Bands," The Bell System Technical Journal, vol. 55, No. 8, Oct. 1976, pp. 1069–1085.

(List continued on next page.)

Primary Examiner—Richemond Dorvil
Assistant Examiner—D. Nolan
(74) Attorney, Agent, or Firm—Sonnenschein, Nath & Rosenthal

(57) ABSTRACT

In case codes of old and new standards are recorded on the same recording medium, it is desirable that the signals of the old standard can be reproduced by an old standard accommodating reproducing device, while both signals can be reproduced by the new standard accommodating reproducing device such as to avoid lowering of the signal quality. To this end, if multi-channel signals are recorded in terms of a frame the size of which cannot be controlled, a second encoding circuit encodes signals of a channel reproduced by the old standard accommodating reproducing device, while a first encoding circuit encodes the signals of a channel reproduced by an old standard accommodating reproducing device with a number of bits smaller than the maximum number of bits that can be allocated to that frame. A codestring generating circuit arrays a codestring encoded by the second encoding circuit in a void area of a frame provided by encoding in the first encoding circuit.

47 Claims, 27 Drawing Sheets

U.S. PATENT DOCUMENTS

| | | | |
|---|---|---|---|
| 5,983,175 | 11/1999 | Shimoyoshi et al. | 704/230 |
| 5,987,418 * | 11/1999 | Gentit | 704/500 |
| 6,049,517 | 4/2000 | Tsutsui | 369/59 |
| 6,128,264 | 10/2000 | Tsutsui | 369/59 |

OTHER PUBLICATIONS

J. Rothweiler, "Polyphase Quadrature Filters—A New Subband Coding Technique," IEEE International Conference on Acoustics, Speech, and Signal Processing, vol. 3, Apr. 1983, pp. 1280–1283.

J. Princen et al., "Subband/Transform Coding Using Filter Bank Designs Based on Time Domain Aliasing Cancellation," IEEE International Conference on Acoustics, Speech, and Signal Processing, vol. 4, Apr. 1987, pp. 2161–2164.

R. Zelinski & P. Noll, "Adaptive Transform Coding of Speech Signals," IEEE Transactions on Acoustics, Speech, and Signal Processing, vol. ASSP–25, No. 4, Aug. 1977, pp. 299–309.

M. Krasner, "The Critical Band Coder—Digital Encoding of Speech Signals Based on the Perceptual Requirements of the Auditory System," IEEE International Conference on Acoustics, Speech, & Signal Processing, vol. 1–3, Apr. 1980, pp. 327–331.

D. Huffman, "A Method for the Construction of Minimum–Redundancy Codes," Proceedings fo the I.R.E., vol. 40, No. 9, Sep. 1952, pp. 1098–1101.

ISO/IEC 11172–3, International Standard, Information Technology—Coding of Ocing Picutres and Associated Audio for Digital Storage Media at up to About 1,5 MBit/S—, Part 3: Audio, pp. 1–150.

* cited by examiner

INFORMATION ENCODING METHOD AND APPARATUS, INFORMATION DECODING METHOD AND APPARATUS AND INFORMATION RECORDING MEDIUM

BACKGROUND OF THE INVENTION

1. Field of the Invention

This invention relates to an information encoding method and apparatus, suitable for expanding the format of the encoded signals, an information decoding method and apparatus, as counterparts of the information encoding method and apparatus, and an information recording medium having the encoded information recorded thereon.

2. Description of the Related Art

There has so far been proposed an information recording medium capable of recording signals such as encoded acoustic information or music information (referred to hereinafter as audio signals), such as a magneto-optical disc. Among methods for high-efficiency encoding of the audio signals, there are a so-called transform coding which is a blocking frequency spectrum splitting method of transforming a time-domain signal into frequency domain signals by orthogonal transform and encoding the spectral components from one frequency band to another, and a sub-band encoding (SBC) method, which is a non-blocking frequency spectrum splitting method of splitting the time-domain audio signals into plural frequency bands without blocking and encoding the resulting signals of the frequency bands. There is also known a high-efficiency encoding technique which is a combination of the sub-band coding and transform coding, in which case the time domain signals are split into plural frequency bands by SBC and the resulting band signals are orthogonally transformed into spectral components which are encoded from band to band.

Among the above-mentioned filters is a so-called QMF filter as discussed in 1976, R. E. Crochiere, Digital Coding of Speech in subbands, Bell Syst. Tech. J. Vol. 55, No. 8, 1976. This QMF filter splits the frequency spectrum into two bands of equal bandwidths and is characterized in that so-called aliasing is not produced on subsequently synthesizing the split bands. The technique of dividing the frequency spectrum is discussed in Joseph H. Rothweiler, Polyphase Quadrature Filters—A New Subband Coding Technique, ICASSP 83 BOSTON. This polyphase quadrature filter is characterized in that the signal can be split into plural bands of equal band-width.

Among the above-mentioned techniques for orthogonal transform is such a technique in which an input audio signal is blocked every pre-set unit time, such as every frame, and discrete Fourier transform (DFT), discrete cosine transform (DCT) or modified DCT (MDCT) is applied to each block for converting the signals from the time axis to the frequency axis. Discussions of the MDCT are found in J. P. Princen and A. B. Bradley, Subband/Transform Coding Using Filter Bank Designs Based on Time Domain Aliasing Cancellation, ICASSP 1987.

If the above-mentioned DFT or DCT is used as a method for transforming waveform signals into spectral signals, and a transform is applied based on a time block composed of M samples, M independent real-number data are obtained. It is noted that, for reducing junction distortions between time blocks, a given time block is usually overlapped with M1 samples with both neighboring blocks, and M real-number data on an average are quantized and encoded in DFT or DCT for (M-M1) samples. It is these M real-number data that are subsequently quantized and encoded.

On the other hand, if the above-mentioned MDCT is used as a method for orthogonal transform, M independent real-number data are obtained from 2M samples overlapped with N samples of both neighboring time blocks. Thus, in MDCT, M real-number data on an average are obtained for M samples and subsequently quantized and encoded. A decoding device adds waveform elements obtained on inverse transform in each block from the codes obtained by MDCT with interference for re-constructing the waveform signals.

In general, if a time block for a transform is lengthened, the spectrum frequency resolution is improved such that the signal energy is concentrated in specified frequency components. Therefore, by using MDCT in which, by overlapping with one half of each of both neighboring blocks, transform is carried out with long block lengths, and in which the number of the resulting spectral signals is not increased beyond the number of the original time samples, encoding can be carried out with higher efficiency than if the DFT or DCT is used. Moreover, since the neighboring blocks have a sufficiently long overlap with each other, the inter-block distortion of the waveform signals can be reduced. However, if the transform block length for a transform is lengthened, more work area is required for the transform, thus making a reduction in size of a reproducing means more difficult.

By quantizing signals split into plural frequency bands by a filter or orthogonal transform, the frequency band in which the quantization noise occurs can be controlled so that encoding can be achieved with higher psychoacoustic efficiency by exploiting acoustic characteristics such as masking effects. If the signal components are normalized with the maximum values of the absolute values of the signal components in the respective bands, encoding can be achieved with still higher efficiency.

As frequency band widths in case of quantizing the frequency components, obtained on splitting the frequency spectrum, it is known to split the frequency spectrum such as to take account of the psychoacoustic characteristics of the human auditory system. Specifically, the audio signals are divided into a plurality of, such as 25, bands using bandwidths increasing with increasing frequency. These bands are known as critical bands. In encoding the band-based data, encoding is carried out by fixed or adaptive bit allocation on the band basis. In encoding coefficient data obtained by MDCT processing by bit allocation as described above, encoding is by an adaptive number of bit allocation for band-based MDCT coefficients obtained by block-based MDCT processing. Among the prior art bit allocation techniques, there are known the following two techniques.

For example, in R. Zelinsky and P. Noll, Adaptive Transform Coding of Speech Signals and in "IEEE Transactions of Acoustics, Speech and Signal Processing", vol. ASSP-25, No. 4, August 1977, bit allocation is performed on the basis of the magnitude of the band-based signals. With this system, the quantization noise spectrum becomes flat, such that the quantization noise is minimized. However, the actual noise feeling is not psychoacoustically optimum because the psychoacoustic masking effect is not exploited.

In a publication "ICASSP 1980, The Critical Band Coder-Digital Encoding of the Perceptual Requirements of the Auditory System", M. A. Krasner, MIT, the psychoacoustic masking mechanism is used to determine a fixed bit allocation that produces the necessary signal-to-noise ratio for each critical band. However, if this technique is used to measure characteristics of a sine wave input, non-optimum results are obtained because of the fixed allocation of bits among the critical bands.

For overcoming these problems, there is proposed a high-efficiency encoding device in which a portion of the total number of bits usable for bit allocation is used for a fixed bit allocation pattern pre-fixed from one small block to another and the remaining portion is used for bit allocation dependent on the signal amplitudes of the respective blocks, and in which the bit number division ratio between the fixed bit allocation and the bit allocation dependent on the signal amplitudes is made dependent on a signal related to an input signal, such that the bit number division ratio to the fixed bit allocation becomes larger if the signal spectrum is smoother.

This technique significantly improves the signal-to-noise ratio on the whole by allocating more bits to a block including a particular signal spectrum exhibiting concentrated signal energy. By using the above techniques, for improving the signal-to-noise ratio characteristics, not only are the measured values increased, but also the sound as perceived by the listener is improved in signal quality, because the human auditory system is sensitive to signals having acute spectral components.

A variety of different bit allocation techniques have been proposed, and a model simulating the human auditory mechanism has also become more elaborate, such that perceptually higher encoding efficiency can be achieved supposing that the encoding device capability is correspondingly improved.

In these techniques, the customary practice is to find real-number reference values for bit allocation, realizing the signal-to-noise characteristics as found by calculations as faithfully as possible, and to use integer values approximating the reference values as allocated bit numbers.

For constructing a real code string, it suffices if the quantization fineness information and the normalization coefficient information are encoded with pre-set numbers of bits, from one normalization/quantization band to another, and the normalized and quantized spectral signal components are encoded. In the ISO standard (ISO/IEC 11172-3:1993 (E), a993), there is described a high-efficiency encoding system in which the numbers of bits representing the quantization fineness information are set so as to be different from one band to another. Specifically, the number of bits representing quantization fineness information is set so as to be decreased with the increased frequency.

There is also known a method of determining the quantization fineness information in the decoding device from, for example, the normalization coefficient information. Since the relation between the normalization coefficient information and the quantization fineness information is set at the time of setting the standard, it becomes impossible to introduce the quantization fineness control based on a more advanced psychoacoustic model in future. In addition, if there is a width in the compression ratio to be realized, it becomes necessary to set the relation between the normalization coefficient information and the quantization fineness information from one compression ratio to another.

There is also known a method of using variable length codes for encoding for realization of more efficient encoding of quantized spectral signal components, as described in D. A. Huffman, A Method for Construction of Minimum Redundancy Codes, in Proc. I.R.E., 40, p. 1098 (1952).

In Japanese Patent Application No. 7-500482 of the present Assignee, there is, disclosed a method of separating perceptually critical tonal components, that is signal components having the signal energy concentrated in the vicinity of a specified frequency, from the spectral signals, and encoding the signal components separately from the remaining spectral components. This enables audio signals to be efficiently encoded with a high compression ration without substantially deteriorating the psychoacoustic sound quality.

The above-described encoding techniques can be applied to respective channels of acoustic signals constructed by plural channels. For example, the encoding techniques can be applied to each of the left channel associated with a left-side speaker and the right channel associated with a right-side speaker. The encoding techniques can also be applied to the (L+R)/2 signal obtained on summing the L-channel and R-channel signals together. The above-mentioned techniques may also be applied to (L+R)/2 and (L−R)/2 signals for realizing efficient encoding. Meanwhile, the amount of data for encoding one-channel signals equal to one-half the data volume required for independently encoding the two-channel signals suffices. Thus, such a method of recording signals on a recording medium is frequently used in which a mode for recording as one-channel monaural signals and a mode for recording as two-channel stereo signals are readied and recording can be made as monaural signals if it is required to make longtime recording.

Meanwhile, the techniques of improving the encoding efficiency are currently developed and introduced one after another, such that, if a standard including a newly developed proper encoding technique is used, it becomes possible to make a longer recording or to effect recording of audio signals of higher sound quality for the same recording time.

In setting the above-described standard, an allowance is left for recording the flag information concerning the standard on the information recording medium in consideration that the standard may be modified or expanded in future. For example, '0' or '1' are recorded as a 1-bit flag information when initially setting or modifying the standard, respectively. The reproducing device complying with the as-modified standard checks if the flag information is '0' or '1' and, if this flag infonnation is '1', the signal is read out and reproduced from the information recording medium in accordance with the as-modified standard. If the flag information is '0', and the reproducing device is also compatible with the initially set standard, the signal is read out and reproduced from the information recording medium on the basis of the standard. If the reproducing device is not compatable with the initially set standard, the signal is not reproduced.

However, if a reproducing device capable of reproducing only the signals recorded by the standard once set ('old standard' or 'first encoding method') is in widespread use, it is not possible with this reproducing device designed compatible with the old standard to reproduce an information recording medium recorded using an upper standard ('new standard' or 'second encoding method') which exploits an encoding system of higher efficiency, thus embarrassing the user of the device. The reproducing device capable of reproducing only the signals recorded by the standard once set is hereinafter termed a reproducing device designed compatible with the old standard.

In particular, some of the reproducing devices at the time the old standard was set (reproducing devices designed to be compatible with the old standard) disregard the flag information recorded on the information recording medium and reproduce the signals on the assumption that the signals recorded on the recording medium are all encoded in accordance with the old standard. That is, if the information recording medium has been recorded in accordance with the new standard, it is not all reproducing devices designed compatible with the old standard that can recognize that the information recording medium has been recorded in this manner. Thus, if the reproducing device designed compatible with the old standard reproduces the information recording medium, having recorded thereon signals compatible with the new standard, on the assumption that the recording medium has recorded thereon the signals compatible with the optical disc standard, there is a fear that the device cannot operate normally or an objectionable noise may be produced.

On the other hand, if signals of different standards, for example, signals of the old standard or those of the new standard, are recorded simultaneously on the same recording medium, the recording areas allocated to these two signals are correspondingly decreased to render it difficult to maintain the quality of the recorded or reproduced signals.

SUMMARY OF THE INVENTION

It is therefore an object of the present invention to provide an information encoding method and apparatus and an information decoding method and apparatus in which, if codes of an old standard and codes of a new standard are recorded on the same recording medium, signals of the old standard can be reproduced by the reproducing device designed compatible with the old standard, while signals of the new standard and those of the old standard can be reproduced by the reproducing device designed compatible with the new standard, and in which sound quality deterioration due to recording the signals of the different standards on the same recording medium can be reduced. It is another object of the present invention to provide an information recording medium used in conjunction with an information encoding method and apparatus and the information decoding method and apparatus.

In one aspect, the present invention provides an information encoding method including encoding signals of a fractional portion of a plural number of channels by a first encoding method for generating first codestrings, encoding signals of the remaining portion of the plural number of channels by a second encoding method for generating second codestrings and arranging the first codestrings and the second codestrings every frame or every plural frames, each frame being of a fixed size.

In another aspect, the present invention provides an information encoding apparatus including first encoding means for encoding signals of a fractional portion of a plural number of channels by a first encoding method for generating first codestrings, second encoding means for encoding signals of the remaining portion of the plural number of channels by a second encoding method for generating second codestrings and codestring arraying means for arraying the first codestrings and the second codestrings every frame or every plural frames, each frame being of a fixed size.

It is seen from above that, in case codes of old and new standards are recorded on the same recording medium, the signals of the old standard can be reproduced by a reproducing device which accommodates the old standard, while both signals can be reproduced by a reproducing device which accommodates the new standard. In addition, it becomes possible to avoid the lowering of the signal quality otherwise caused by recording signals of different standards on the same recording medium. Specifically, according to the present invention, multi-channel reproduction for a prolonged time duration reproducing device which accommodates the new standard while the reproduction remains enabled by the reproducing device which accommodates the old standard, thus enabling the standards for optical discs or the like to be extended without dismaying the user. In addition, the lowering of the sound quality otherwise caused by a multi-channel system can be minimized. Furthermore, other objects of the invention will become clear upon reading the specification and referring to figures that follow.

DESCRIPTION OF THE PREFERRED EMBODIMENTS

Figure 1:
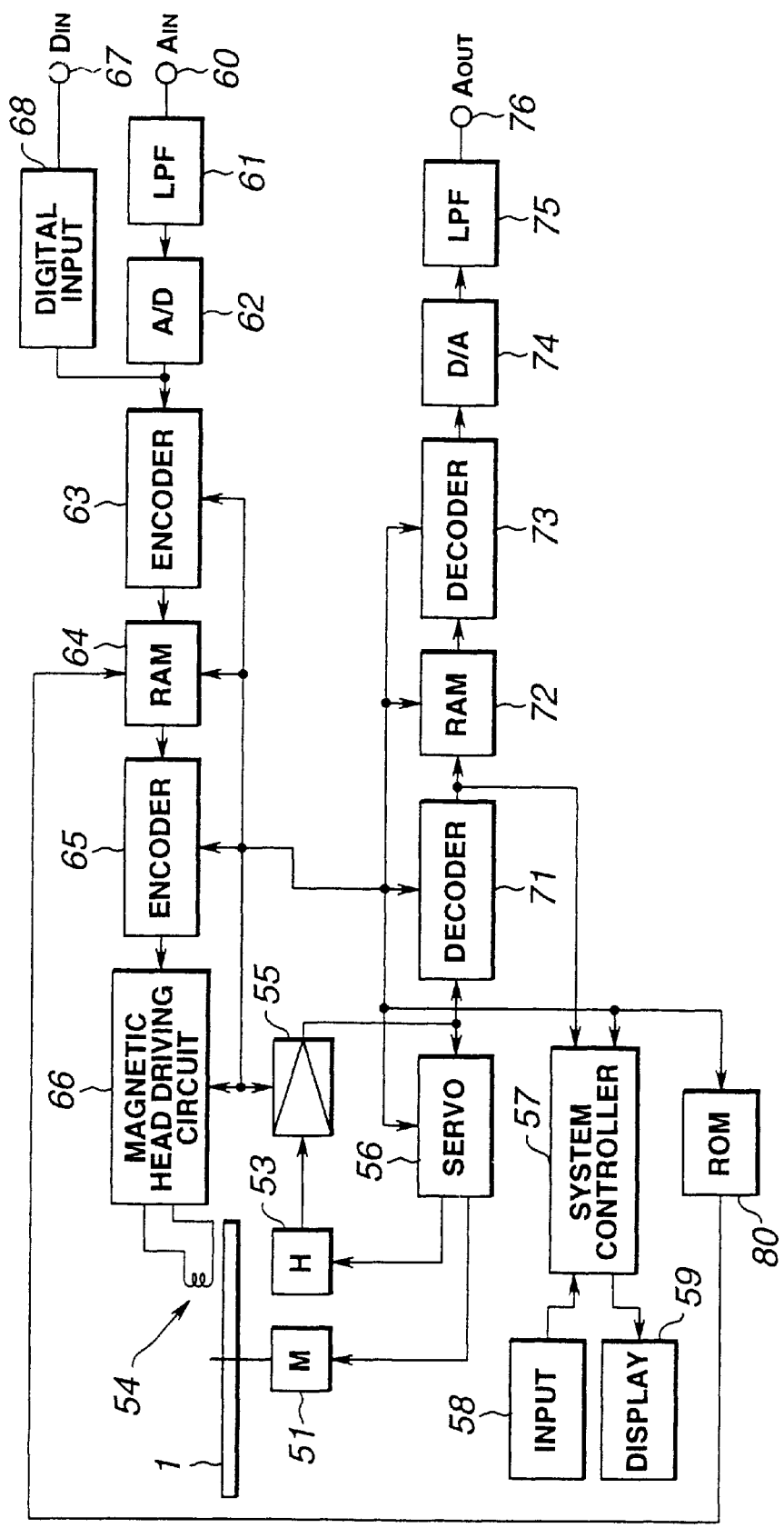
FIG. 1 is a block circuit diagram illustrating a recording/reproducing apparatus as an embodiment of the recording/reproducing apparatus for compressed data according to the present invention.

Referring to the drawings, preferred embodiments the present invention will be explained in detail.

Referring to FIG. 1, an example of a compressed data recording and/or reproducing device, embodying the present invention, is hereinafter explained.

In the compressed data recording and/or reproducing device, shown in FIG. 1, a magneto-optical disc 1, run in rotation by a spindle motor 51, is used as a recording medium. For recording data on the magneto-optical disc 1, a magnetic field modulated in accordance with recording data is applied to the magneto-optical disc 1 by a magnetic head 54, whilst a laser light beam is illuminated by an optical head 53 thereon, by way of magnetic field modulation recording, for recording data on a recording track of the magneto-optical disc 1. For reproduction, the recording track of the magneto-optical disc 1 is traced with the laser light beam by the optical head 53 for photomagnetically reproducing the recorded data.

The optical head 53 is made up of optical components, such as a laser light source, for example, a laser diode, a collimator lens, an objective lens, a polarization beam splitter or a cylindrical lens and a photodetector having a pre-set pattern. For recording data on the magneto-optical disc 1, the magnetic head 54 is driven by a head driving circuit 66 of a recording system, as later explained, for impressing a modulation magnetic field corresponding to the recording data, and the laser light beam is illuminated on a target track of the magneto-optical disc 1 for effecting thermomagnetic recording in accordance with the magnetic field modulation system. The optical head 53 also detects the reflected laser light from the target track for detecting the focusing error and the tracking error by the astigmatic method and by the push-pull method, respectively. For reproducing the focusing error and the tracking error, the optical disc 53 detects the focusing error and the tracking error, while simultaneously detecting the difference in the polarization angle (Kerr rotation angle) of the reflected laser light from the target track for generating the playback signals.

An output of the optical head 53 is supplied to a RF circuit 55 which extracts the focusing error signals and the tracking error signals from the output of the optical head 53 to supply the extracted signals to a servo control circuit 56, while converting the playback signals to a bi-level signal which is supplied to a decoder 71 of the reproducing system.

The servo control circuit 56 is made up of, for example, a focusing servo control circuit, a tracking servo control circuit, a spindle motor servo control circuit and a thread servo control circuit. The focusing servo control circuit focusing-controls the optical system of the optical head 53 for reducing the focusing error signals to zero, while the tracking servo control circuit tracking-controls the optical system of the optical head 53 for reducing the tracking error signals to zero. The spindle motor servo control circuit controls the spindle motor 51 so that the magneto-optical disc 1 will be run in rotation at a pre-set rotational velocity, such as at a pre-set linear velocity. The thread servo control circuit also moves the optical head 53 and the magnetic head 54 to a target track position on the magneto-optical disc 1 designated by a system controller 57. The servo control circuit 56, performing these various control operations, sends the information specifying the operating states of the various components controlled by the servo control circuit 56 to the system controller 57.

To the system controller 57 are connected a key input operating unit 58 and a display unit 59. The system controller 57 supervises the recording system and the reproducing system by the operating input information from the key input unit 58. The system controller 57 also supervises the recording position or the playback position on the recording track traced by the optical head 53 and the magnetic head 54, based on the sector-based address information reproduced by the header timer or subcode Q-data from the recording track of the magneto-optical disc 1. The system controller 57 also performs control of displaying the playback time on the display unit 59 based on the data compression rate of the compressed data recording/reproducing device and the playback position information on the recording track.

For playback time display, the sector-based address information (absolute time information) reproduced by the header data or the sub-code Q-data from the recording track of the magneto-optical disc 1 is multiplied by a reciprocal of the data compression ratio, such as 4 for the ¼ compression, in order to find the actual time information, which is displayed on a display unit 59. For recording, if the absolute time information is pre-recorded (pre-formatted) on the recording track of, for example, a magneto-optical disc, the preformatted absolute time information can be read out and multiplied by the reciprocal of the data compression ratio for displaying the current position in terms of the actual recording time.

In this recording system of the disc recording/reproducing device, an analog audio input signal $A_{in}$ at an input terminal 60 is supplied via a low-pass filter 61 to an A/D converter 62 which then quantizes the analog audio input signal $A_{in}$. The digital audio input signal $D_{in}$ from the input terminal 67 is supplied via a digital input interfacing circuit 68 to the ATC (Adaptive Transform Coding) encoder 63. The ATC encoder 63 performs bit compression (data compression) corresponding to a pre-set data compression ratio on the digital audio PCM data of the pre-set transfer rate obtained on quantization of the input signal $A_{in}$ by the A/D converter 62. The compressed data (ATC data) outputted by the pre-set data compression ratio is supplied to a memory 64. Supposing that the data compression ratio is ⅛, the data transfer rate is reduced to one-eighth of the data transfer rate of the CD-DA format as the standard digital audio CD format of 75 sectors/sec or to 9.375 sectors/second.

The memory (RAM) 64 is used as a buffer memory having data write/readout controlled by the system controller 57 and which is configured for transiently holding on memory the ATC data supplied from the ATC encoder 63 for recording the data on a disc whenever the necessity arises. That is, if the data compression ratio is ⅛, for example, the compressed audio data supplied from the ATC encoder 63 has its data transfer rate reduced to ⅛ of the data transfer rate for the standard CD-DA format of 75 sectors/second, that is to 9.375 sectors/second. The compressed data (ATC data) are continuously recorded in the memory 64. For these compressed data (ATC data), it suffices to record the data at a rate of one sector per eight sectors, as discussed previously. However, since this recording every eight sectors is virtually impossible, sector-continuous recording is carried out, as will be explained subsequently. This recording is carried out in a burst fashion at the same data transfer rate as that for the standard CD-DA format (75 sectors/second), with preset plural sectors, such as 32 sectors plus several sectors, as a recording unit.

That is, the ATC audio data with the data compression rate of ⅛, continuously written at a low transfer rate of 9.375 (=⅞) sectors/second, are read out from the memory 64 in a burst-like manner as recording data at the above-mentioned transfer rate of 75 sectors/second. The overall data transfer rate of the data, thus read out and recorded, including the non-recording period, is the above-mentioned low rate of 9.375 sectors/second. However, the instantaneous data transfer rate within the time of the burst-like recording operation is the above-mentioned standard rate of 75 sectors/second. Therefore, if the rotational velocity of the disc is the above-mentioned standard velocity of the CD-DA format (constant linear velocity), recording is by the same recording density and the same recording pattern as those of the CD-DA format.

The ATC audio data, that is the recording data, read out from the memory 64 in the burst-like fashion at the (instantaneous) transfer rate of 75 sectors/second, are supplied to an encoder 65. In the data string supplied from the memory 64 to the encoder 65, a continuous recording unit per each recording is a cluster made up of plural sectors, such as 32 sectors, and several cluster-interconnecting sectors arrayed ahead and at back of the cluster. These cluster interconnecting sectors are set so as to be longer than the interleaving length at the encoder 65, such that interleaving cannot affect data of other clusters.

The encoder 65 applies encoding for error correction, such as parity appendage and interleaving, or EFM encoding, to the recording data supplied in a burst-like fashion from the memory 64. The recording data encoded by the encoder 65 are supplied to the magnetic head driving circuit 66. To this magnetic head driving circuit 66 is connected the magnetic head 54 so that the magnetic head 54 is driven for applying the magnetic field modulated in accordance with the recording data to the magneto-optical disc 1.

The system controller 57 performs memory control, as described above, on the memory 64, while also controlling the recording position for continuously recording the recording data continuously in a burst-like fashion from the memory 64 by this memory control on the recording track of the magneto-optical disc 1. For controlling the recording position in this manner, the recording position read out in a burst fashion from the memory 64 is supervised by the system controller 57 for supplying a control signal designating the recording position on the recording track of the magneto-optical disc 1 to the servo control circuit 56.

The reproducing system of the disc recording/reproducing device shown in FIG. 1 is now explained. This reproducing system is configured for reproducing recording data continuously recorded on the recording track of the magneto-optical disc 1 by the above-described recording system. Thus, the reproducing system includes a decoder 71 supplied with a bi-level signal obtained by a RF circuit 55 from the playback output obtained in turn by the optical head 53 tracing the recording track of the magneto-optical disc 1 with a laser light beam. It is noted that not only the magneto-optical disc but also the read-only optical disc similar to the compact disc (CD) can be read.

The decoder 71 is a counterpart device of the encoder 65 of the above-described recording system. The playback output, converted into the bi-level signal by the RF circuit 55, is decoded for error correction or EFM decoded for reproducing the ATC audio data having the data compression rate of ⅛ at a transfer rate of 75 sectors/second which is faster than the normal transfer rate. The playback data, obtained by the decoder 71, is supplied to a memory 72.

In the memory (RAM) 72, having data write/readout controlled by the system controller 57, the playback data supplied from the decoder 71 at the transfer rate of 75 sectors/second is written in a burst-like fashion at the transfer rate of 75 sectors/second. In the memory 72, the above-mentioned playback data, written at the above-mentioned transfer rate of 75 sectors/second, is continuously read out at the transfer rate of 9.375 sectors/second corresponding to the data compression rate of ⅛.

The system controller 57 performs memory control for writing the playback data in the memory 72 at the transfer rate of 75 sectors/second, while reading out the playback data from the memory 7 at the transfer rate of 9.375 sectors/second. The system controller 57, performing the memory control for the memory 72 as described above, controls the playback position for continuously reading out the playback data written in the burst-like fashion from the memory 72 by the memory control from the recording track of the magneto-optical disc 1. The playback position control is preferred by supervising the playback position of the playback data read out in the burst-like fashion from the memory 72 by the system controller 57 and by supplying a control signal designating the playback position on the recording track of the optical disc 1 or the magneto-optical disc 1 to the servo control circuit 56.

The ATC audio data, continuously read out from the memory 72 at the transfer rate of 9.375 sectors/second, is supplied to an ATC decoder 73. This ATC decoder 73 is a counterpart device of the ATC encoder 63 of the recording system and reproduces the 16-bit digital audio data by expanding the ATC data by a factor of eight. The digital audio data from the ATC decoder 73 is supplied to a D/A converter 74.

The D/A converter 74 converts the digital audio date supplied from the ATC decoder 73 into an analog signal for forming an analog audio output signal $A_{out}$. This analog audio output signal $A_{out}$ obtained from the D/A converter 74, is outputted via a low-pass filter 75 at an output terminal 76.

The high-efficiency encoding is explained in detail below. Specifically, the technique of high-efficiency encoding an input digital signal, such as an audio PCM signal, by techniques of sub-band coding (SBC), adaptive transform coding (ATC) and adaptive bit allocation is explained by referring to FIG. 2 et seq.

In the information encoding device (encoder 63 of FIG. 1) for executing the method for encoding the information (acoustic waveform signals) of the present invention, an input signal waveform 110a is converted by a conversion circuit 111a into signal frequency components 110b. These signal frequency components 110b are then encoded by a signal component encoding circuit 111b to produce an encoded signal 110c. A codestring generating circuit 111c then generates a codestring 110d from an encoded signal 110c generated by the codestring generating circuit 111c.

Figure 2:
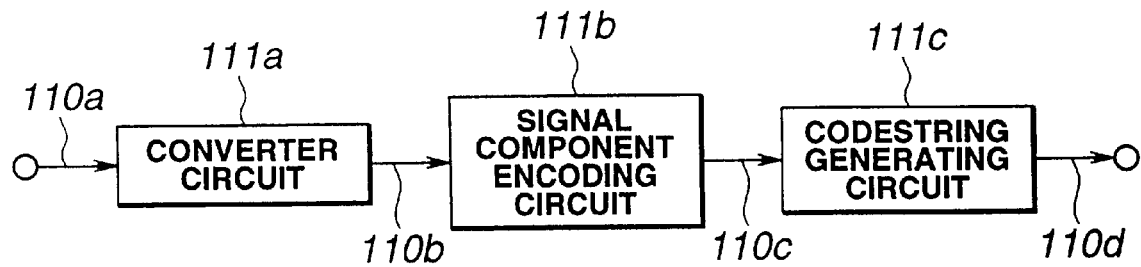
FIG. 2 is a block circuit diagram showing an illustrative structure of an encoding circuit according to the present invention.
Figure 3:
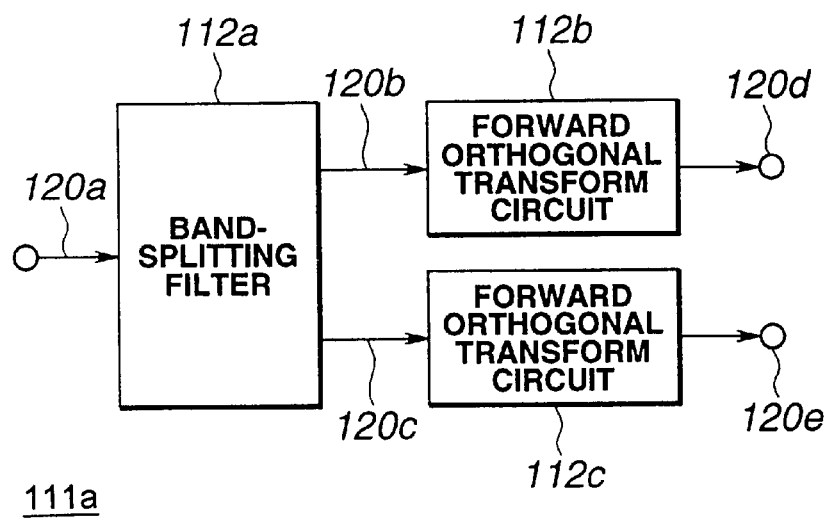
FIG. 3 is a block circuit diagram showing an illustrative structure of a signal component encoding circuit according to the present invention.

Referring to FIG. 3, the conversion circuit 111a splits the input signal 120a by a bandsplitting filter 112a into two bands and resulting two band signals 120b and 120c are transformed by forward orthogonal transform circuits 112b and 112c by MDCT into spectral signal components 120d and 120e. The input signal 120a corresponds to the signal waveform 110a of FIG. 2, while the spectral signal components 120d, 120e correspond to the signal frequency components 110b shown in FIG. 2. In the conversion circuit 111a, the bandwidths of the two band-split signals 120b and 120c arc one-half the bandwidth of the input signal 120a; that is, the input signal 120a is thinned out by ½. Of course, any other structure of the conversion circuit 111a may be used besides the illustrative example. For example, the input signal may be directly transformed by MDCT into spectral signals, while the input signal may also be transformed by DFT or DCT, instead of by MDCT. Although the input signal may be split into frequency components by a band splitting filter, the input signal is preferably transformed by the above-mentioned orthogonal transform methods into frequency components because then a large number of frequency components can be obtained with a smaller volume of processing operations.

Figure 4:
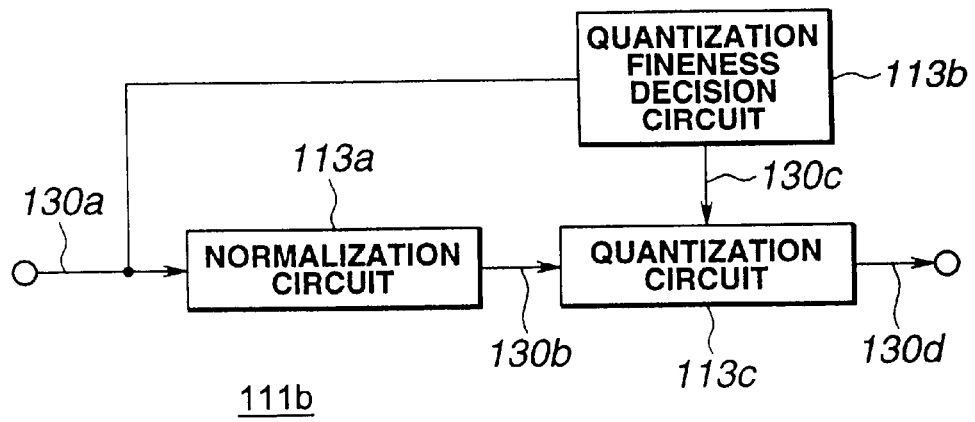
FIG. 4 is a block circuit diagram showing an illustrative structure of a conversion circuit according to the present invention.

The signal component encoding circuit 111b normalizes the signal components 130a from one pre-set band to another, by a normalization circuit 113a, while calculating the quantization fineness information 130c from the signal components 130a by the quantization fineness decision circuit 113b, as shown in FIG. 4. The quantization circuit 113c quantizes the normalized signals 130b from the normalization circuit 113a based on the quantization fineness information. The output signal 130d includes the normalization coefficient information for normalization and the above-mentioned quantization fineness information, in addition to the quantized signal components.

Figure 5:
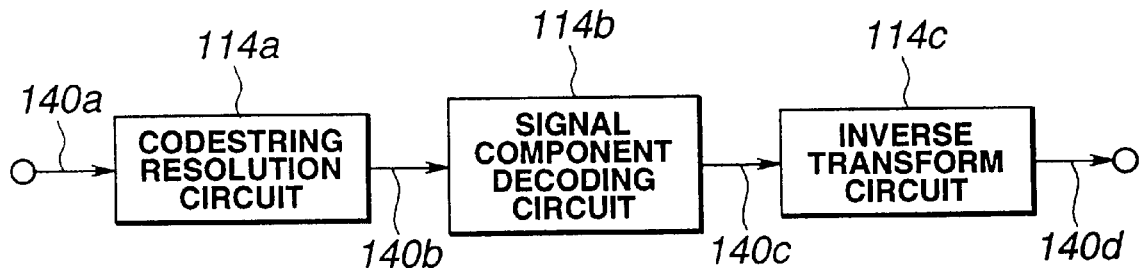
FIG. 5 is a block circuit diagram showing an illustrative structure of a decoding circuit according to the present invention.

In the information decoding apparatus (decoder 73 of FIG. 1) for regenerating the audio signals from the codestring generated by the above-described information encoder, codes 140b of the signal components are extracted from a codestring 140a by a codestring resolution circuit 114a, as shown in FIG. 5. From these codes 140b, signal components 140c are restored by a codestring decoding circuit 114b and, from the restored signal components 140c, acoustic waveform signals are regenerated by a back-conversion circuit 114c.

Figure 6:
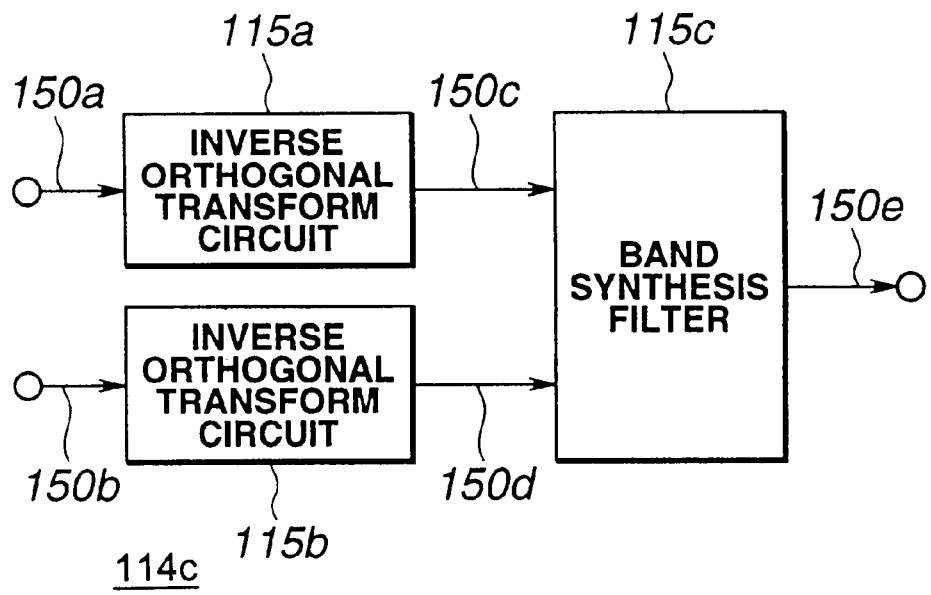
FIG. 6 is a block circuit diagram showing an illustrative structure of a back-conversion circuit according to the present invention.

This back-conversion circuit 114c of the information decoder is configured as shown in FIG. 6 and is associated with the conversion circuit shown in FIG. 3. In the back-conversion circuit 114c, shown in FIG. 6, inverse orthogonal transform circuits 115 and 115b apply inverse orthogonal transform to input signals 150a and 150b, respectively, for restoring the band signals, which are then synthesized by a band synthesizing filter 115c. The input signals 150a and 150b correspond to a signal 140c the signal components of which have been restored by the signal component decoding circuit 114b. An output signal 150e of the band synthesizing filter 115c corresponds to the acoustic waveform signal 140d of FIG. 5.

Figure 7:
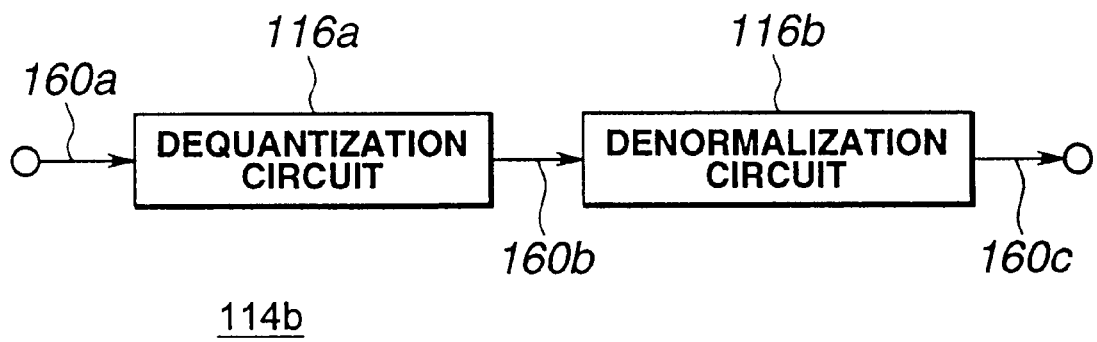
FIG. 7 is a block circuit diagram showing an illustrative structure of a signal component decoding circuit according to the present invention.

The signal component decoding circuit 114b of FIG. 5 is configured as shown in FIG. 7, and applies dequantization and denormalization processing to the codes 140b from the codestring resolution circuit 114a, which are in the form of spectral signals. In the signal component decoding circuit 114b, shown in FIG. 7, a dequantization circuit 116a dequantizes input codes 160a, while the denormalization circuit 116b denormalizes the signals 160b obtained on dequantization to output signal components 160c. The above codes 160a correspond to codes 140b from the codestring resolution circuit 114a of FIG. 5, while the output signal components 160c correspond to the signal components 140c of FIG. 5.

Figure 8:
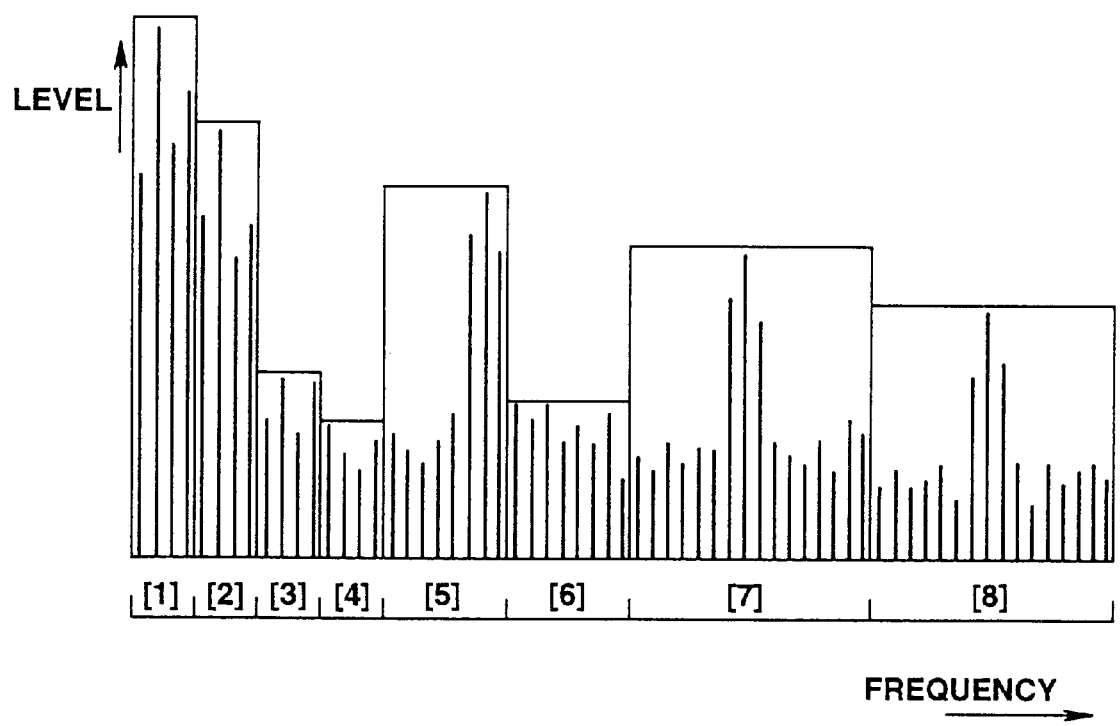
FIG. 8 illustrates a basic encoding method.

The spectral signals obtained by the conversion circuit of the above-described information encoder, shown, in FIG. 3, are as shown for example, in FIG. 8. The spectral components shown in FIG. 8 denote absolute values of the spectral components by MDCT after level conversion by dB. That is, in this information encoder, the input signal is converted into 64 spectral components, from one pre-set transform block to another, and is normalized and quantized in terms of eight bands, termed herein encoding units, shown in [1] to [8] in FIG. 8. If the quantization fineness is varied from one encoding unit to another depending on how the frequency components are distributed, there is assured encoding with perceptually high efficiency with suppression of the sound quality deterioration to the minimum.

Figure 9:
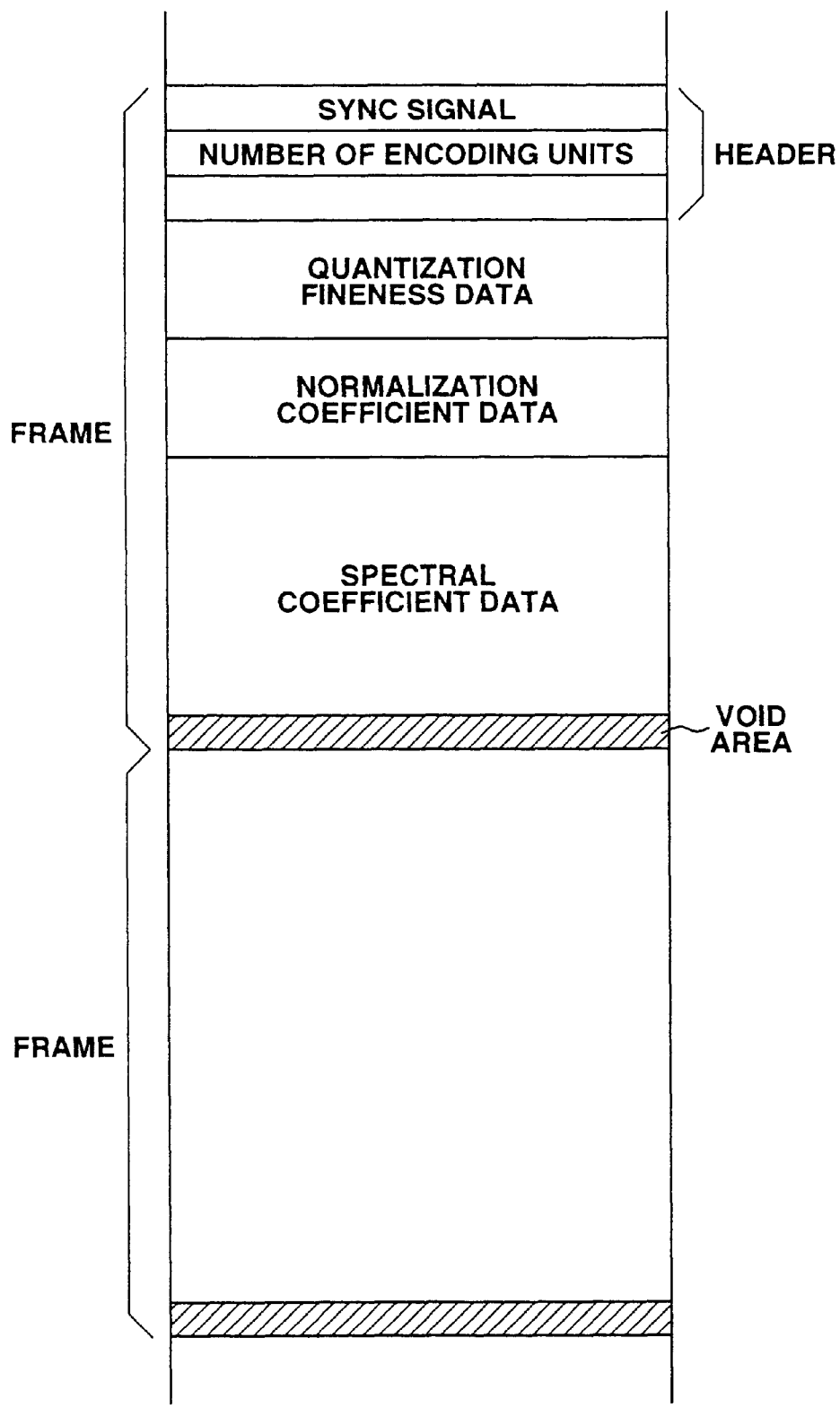
FIG. 9 illustrates the structure of a codestring of a frame encoding in accordance with a basic encoding method.

FIG. 9 shows an illustrative structure of a codestring in case of encoding as described above.

In the codestring of the present illustrative structure, there is arranged the information which is the data used for restoring the spectral signals of each transform block and which has been encoded in association with plural frames each constituted by a pre-set number of bits. At the leading end (header) of each frame is arrayed the information which is control data, such as previously encoded encoding units and the sync signals, encoded with a pre-set number of bits. The header information is followed by the information obtained on sequentially encoding the quantization fineness data and the normalization coefficient data of the encoding units in the order of the increasing frequency of the encoding units. At the trailing end of each header are spectral coefficient data normalized and quantized on the basis of the above-mentioned normalization coefficient data and the quantization fineness data from one encoding unit to another, in the order of the increasing frequency of the encoding units.

The number of bits actually required for restoring the spectral signals of the transform block is set depending on the number of encoded encoding units and the number of the quantization bits specified by the quantization fineness information of each encoding unit, and may be varied from frame to frame. Only the above-mentioned required number of bits from the leading end of each frame is significant at the time of reproduction, with the remaining area of each frame being void area not influencing the playback signals. Usually, a larger number of bits are effectively used for minimizing the void area of each frame.

By encoding each transform block in association with the frame of a pre-set number of bits, the recording position of an optional transform block can be calculated easily, thus enabling facilitated random accessing, that is data reproduction from an optional position.

Figure 10:
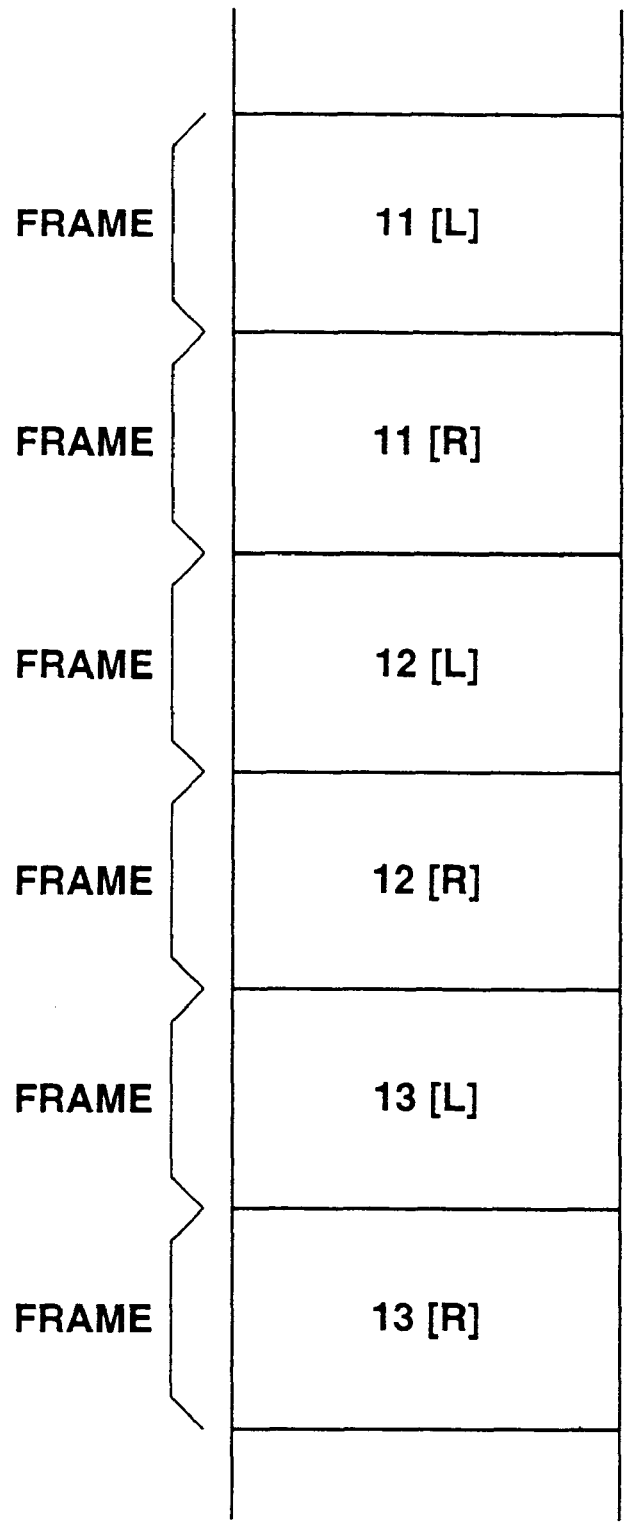
FIG. 10 illustrates an example of arranging L and R channels from frame to frame.
Figure 11:
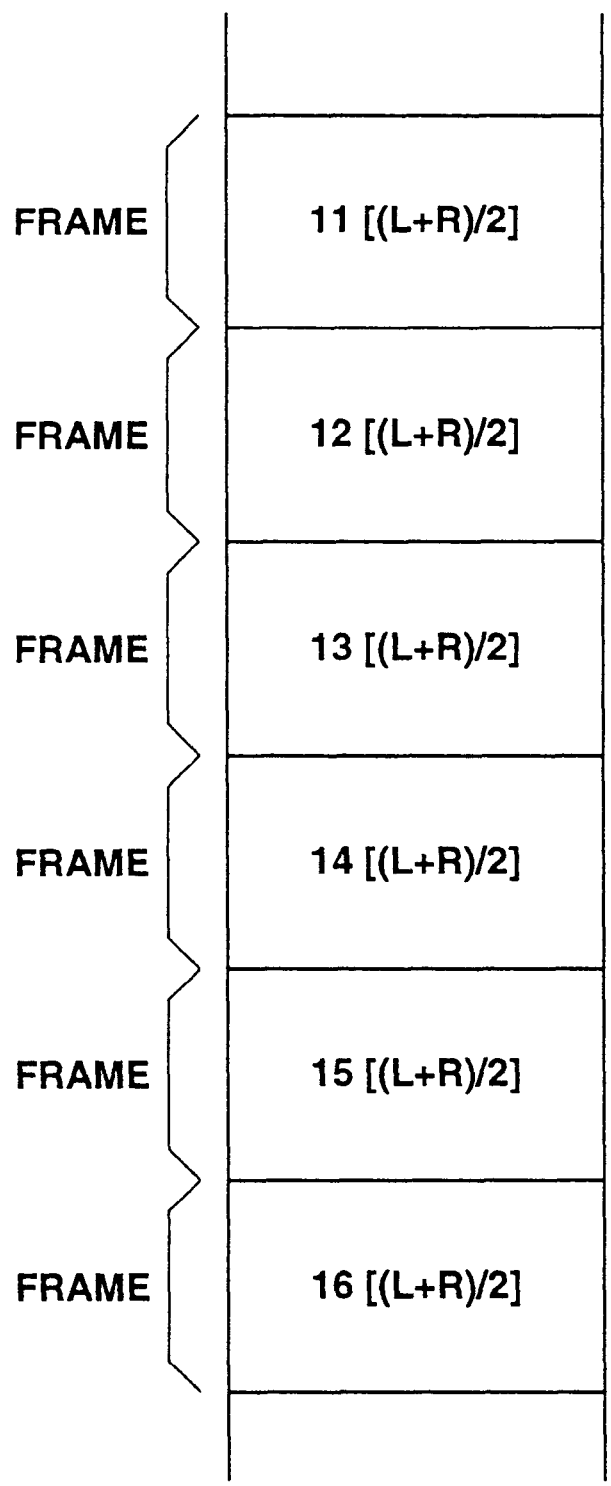
FIG. 11 shows an example of arranging the (L+R)/2 channel in a frame.

FIGS. 10 and 11 show an example of the recording format in case of chronologically recording the frame data shown in FIG. 9 on a recording medium. FIG. 10 shows an example of alternately arranging signals of two channels, such as a left (L) channel and a right (R) channel, on the frame basis, while FIG. 11 shows an example in which one-channel signals generated by (L+R)/2 operation of left (L) and right (R) channels (monaural signals generated from the left and right channels) are arranged on the frame basis.

By using the recording format shown in FIG. 10, the two channels of L and R can be recorded on the same recording medium. On the other hand, if the recording format of arranging only one channel of (L+R)/2 on the frame basis, as shown in FIG. 11, is used, signal recording/reproduction for double time duration becomes possible as compared to the recording format in which the two channels of L and R are arranged alternately on the frame basis as shown in FIG. 10, while the reproduction may be facilitated without complicating the reproducing circuit.

If the recording format shown in FIG. 10 is termed the standard time mode, the recording format enabling long-time recording/reproduction with a smaller number of channels can be tenned a long time mode enabling recording/reproduction twice as long as the above-described standard time mode. If, in the example of FIG. 10, one of the L and R channels, instead of both the L and R channels, is recorded, the signal that can be recorded is twice as long as the time required for recording both the L and R channels. This recording mode can also be termed the long-time mode.

Although the foregoing description is limited to the technique of the encoding method explained with reference to FIG. 9, it is also possible to improve the encoding efficiency further with respect to the encoding method of FIG. 9.

For example, the so-called variable length coding, in which a short code length and a longer code length are allocated to quantized spectral signals of higher and lower frequency of occurrence, respectively, may be used for improving the encoding efficiency.

In addition, if the above-mentioned pre-set transform block in encoding the input signals, that is the time block length for orthogonal transform, is set to a longer value, the amount of the subsidiary information, namely the quantization fineness information or the normalization coefficient information, can be reduced relatively per block, while the frequency resolution is improved. This enables the quantization fineness to be controlled on the frequency axis more finely, thus improving the encoding efficiency.

There is also disclosed in the Japanese Patent Application No. 7-500482 by the present Assignee a method of separating perceptually crucial tonal signal components from the spectral signal components for encoding independently of other spectral signal components. If this method is used, audio signals or the like can be encoded efficiently at a high compression ratio without substantially producing perceptual signal deterioration.

Figure 12:
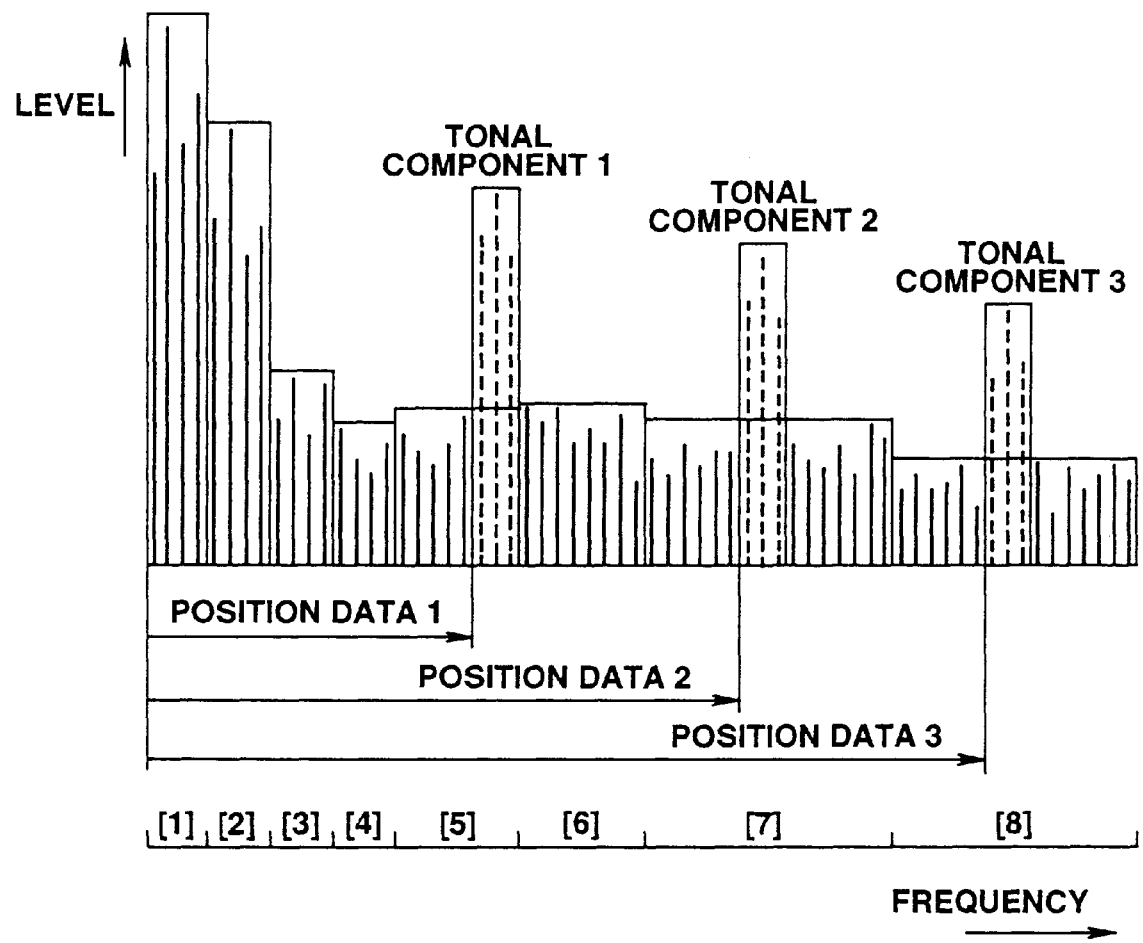
FIG. 12 illustrates an encoding method of separately encoding signal components in tonal and non-tonal components.

The method of separating and encoding the tonal signal components is explained with reference to FIG. 12. In the example of FIG. 12, there is shown the state in which three tonal component sets, as tonal signal components, have been separated from the spectral signal components. The signal components, making up these tonal component sets, are encoded along with the respective position data of the tonal components on the frequency axis.

In general, the signal components of the tonal components, in which the signal energy is concentrated in a small number of spectral components, need to be quantized to an extremely high degree of fineness. The spectral components in each encoding unit lacking tonal components (non-tonal spectral signal components) can be quantized with a relatively small number of bits without deteriorating the perceptual sound quality.

Although only a relatively small number of spectral signal components are shown in FIG. 12 for simplifying the drawing, the signal energy is concentrated in a few signal components of tens of signal components making up a given encoding unit. Therefore, the amount of data is not increased significantly as a result of separation of the tonal components, such that the encoding efficiency can be improved on the whole by separating the tonal components.

Figure 13:
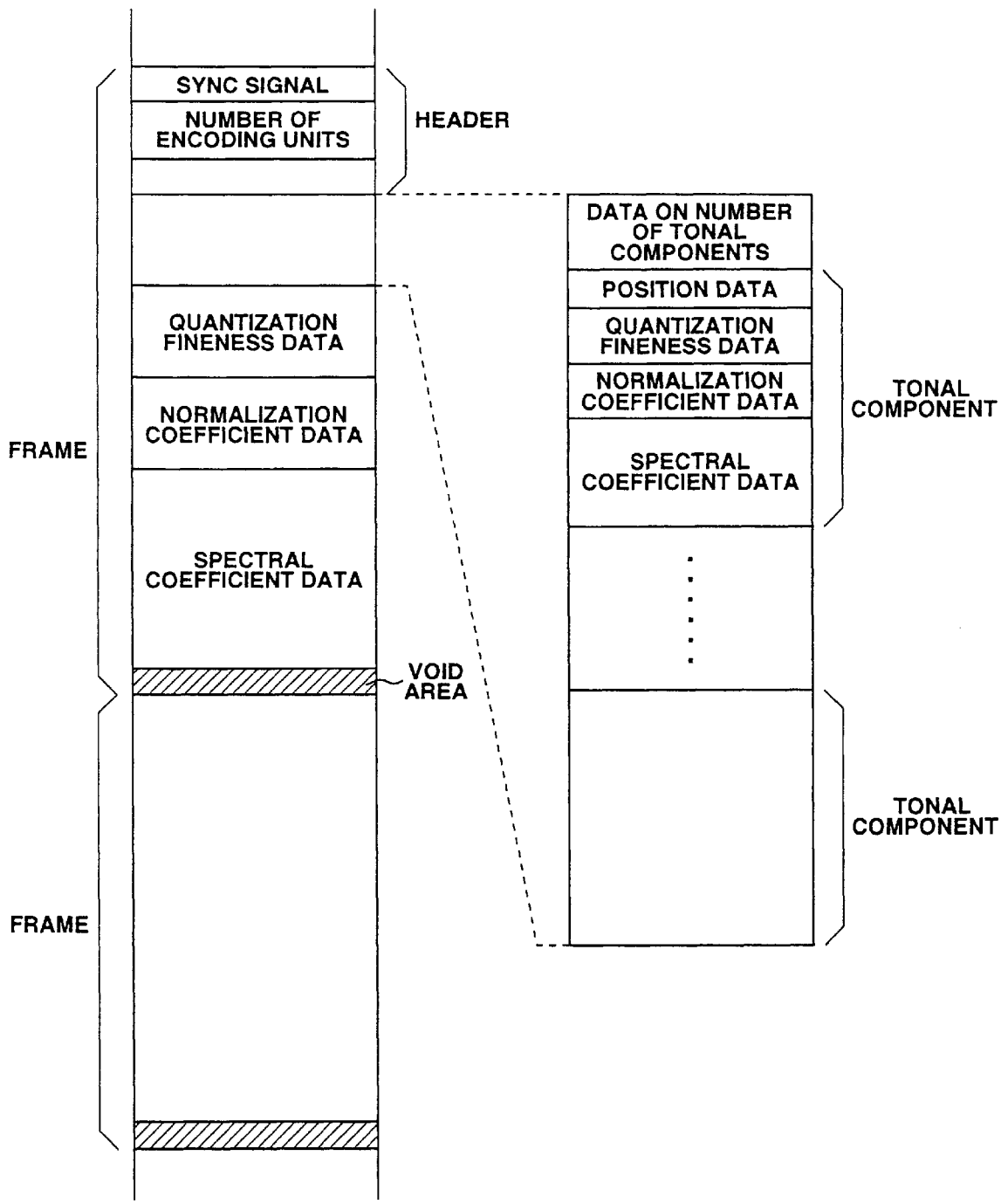
FIG. 13 shows a structure of a codestring obtained on encoding by the encoding method of separately encoding signal components in tonal and non-tonal components.

FIG. 13 shows an illustrative structure of a codestring in case of encoding by the method explained with reference to FIG. 12. In the present illustrative structure, there is arrayed, at the leading end of each frame, the information comprised of control data, such as sync signals and the encoded number of the encoding units, encoded with a pre-set number of bits, as a header portion. Next to the header portion is arrayed the information comprised of the encoded tonal component data as tonal component data.

As tonal component data, the information which indicates the encoded number of signal components in the tonal components is arrayed first and is followed by the information which indicates the encoded position of the tonal components on the frequency axis, the encoded information regarding the normalization coefficients and the infonnation regarding the normalized, quantized and encoded tonal signal components, in this order.

Next to the tonal component data is arrayed the information which is the encoded data of the residual signal left after subtraction of the tonal signal components from the original spectral signal components. This residual signal can also be termed noisy signal components. This residual signal is comprised of quantization fineness data and normalization coefficient data of each encoding unit, spectral component signals normalized and quantized based on the normalization coefficients data and the quantization fineness data (signal components other than the tonal components) encoded in the order of the increasing frequency of the encoding units. It is noted that spectral signal components of the tonal and other signal components (coefficient data) are encoded by VLC (variable length code).

Figure 14:
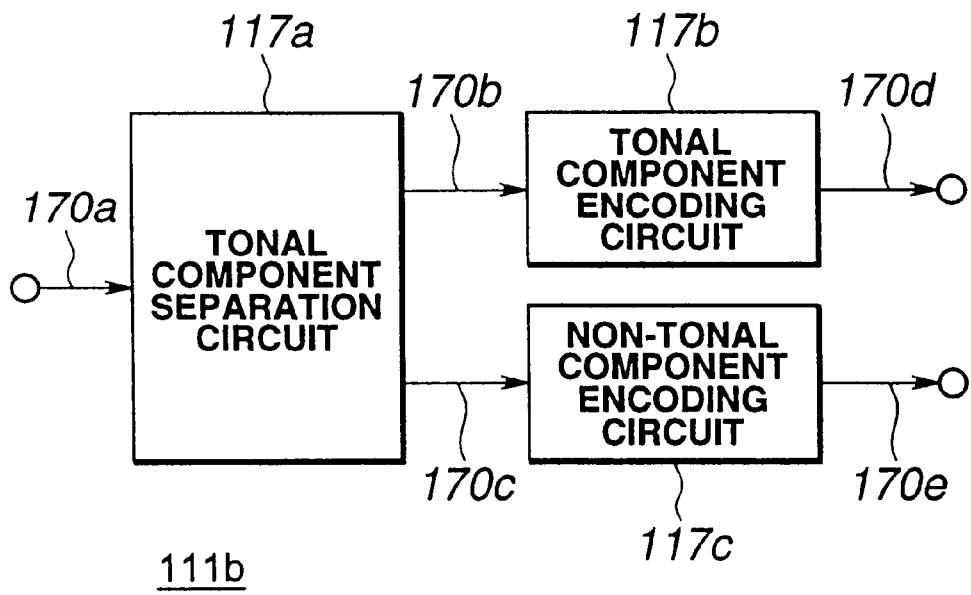
FIG. 14 is a block circuit diagram showing an illustrative structure of a signal component encoding circuit of separately encoding signal components in tonal and non-tonal components.

FIG. 14 shows an illustrative example of the signal component encoding circuit 111b of FIG. 2 when separating the tonal signal components from the above-mentioned respective signal components.

In the signal component encoding circuit 111b, shown in FIG. 14, the signal components 170a (110b) sent from the conversion circuit 111a of FIG. 2 are sent to a tonal component separation circuit 117a. The signal components 170a are separated into tonal signal components 170b and other signal components 170c (non-tonal signal components). The tonal signal components 170b are sent to a tonal component encoding circuit 117b, while the non-tonal signal components 170c are sent to a non-tonal component encoding circuit 117c. The tonal component encoding circuit 117b and the non-tonal component encoding circuit 117c encode the signal components supplied thereto to output resulting output signals 170d and 170e. The tonal component encoding circuit 117b generates the information constituting the tonal component data of FIG. 13, at the same time as it encodes the information constituting the tonal component data of FIG. 13. The signal encoding arrangements in the tonal component encoding circuit 117b and in the non-tonal component encoding circuit 117c are the same as those shown in FIG. 4.

Figure 15:
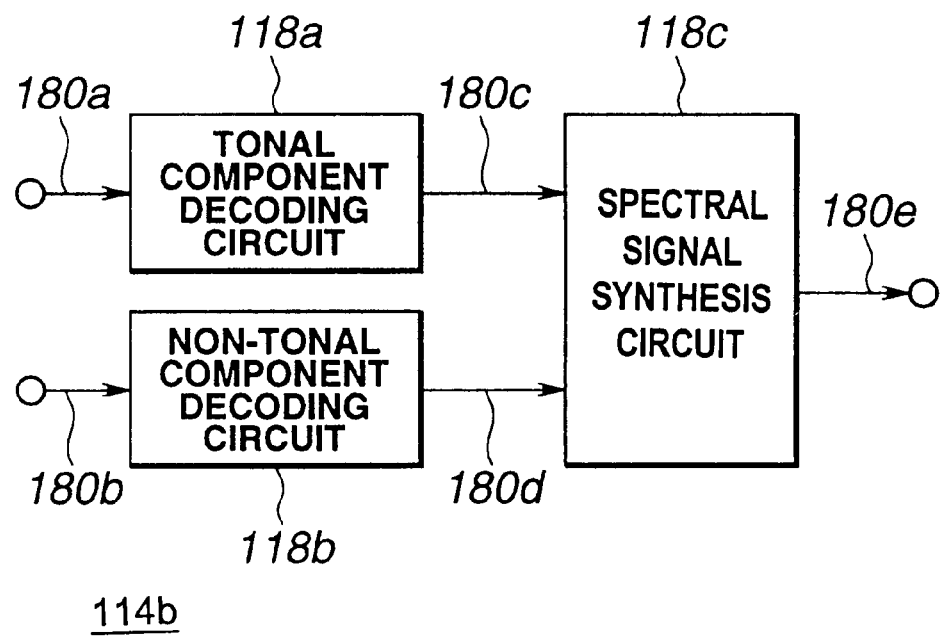
FIG. 15 is a block circuit diagram showing an illustrative structure of a signal component decoding circuit for decoding encoded signals obtained by separately encoding signal components in tonal and non-tonal components.

FIG. 15 shows an illustrative example of the signal component decoding circuit 114b in case the tonal signal components have been separated from the respective signal components.

In the signal component decoding circuit 114b, shown in FIG. 15, the code 140b supplied from the codestring resolution circuit 114a of FIG. 5 is made up of tonal component data 180a and non-tonal component data 180b, which are sent to associated tonal component decoding circuit 118a and non-tonal component decoding circuit 118b, respectively. The tonal component decoding circuit 118a decodes the tonal signal components from the tonal component data shown in FIG. 13 to output resulting tonal signal components 180c. The non-tonal component decoding circuit 118b decodes the tonal signal components from the non-tonal component data to output resulting non-tonal signal components 180d. These tonal signal components 180c and the non-tonal signal components 180d are both sent to a spectral signal synthesis circuit 118c, which then synthesizes the tonal signal components and the non-tonal signal components based on the above-mentioned position data to output the resulting signal components 180e. The decoding configurations of the tonal component decoding circuit 118a and the non-tonal component decoding circuit 118b are the same as those shown in FIG. 7.

Figure 16:
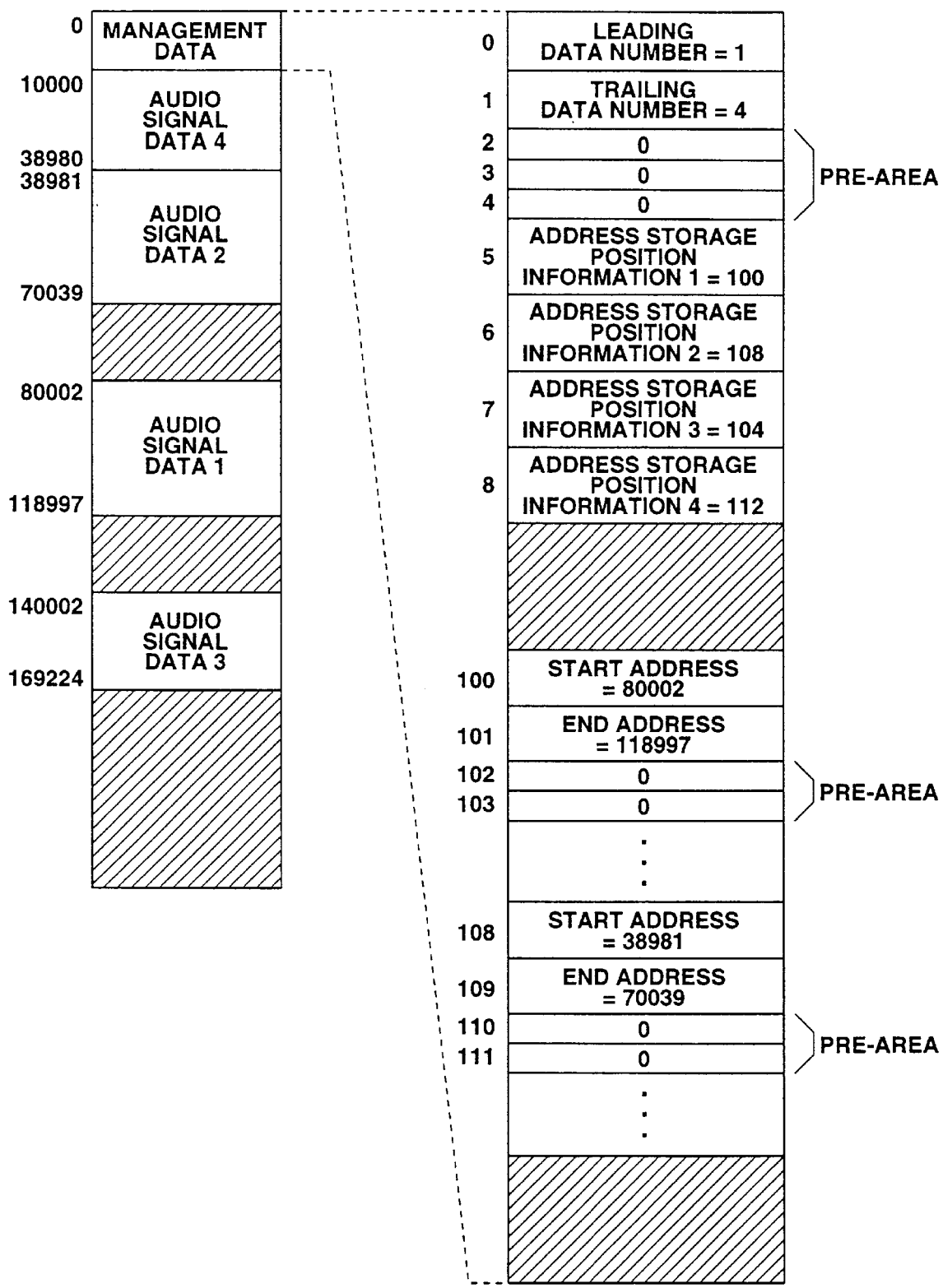
FIG. 16 illustrates a recording format in recording a codestring of an A-codec.

FIG. 16 shows a formatting example in case the signals encoded as described above are recorded on, for example, a magneto-optical disc. In the embodiment of FIG. 16, audio signal data corresponding to, for example, four musical numbers are recorded.

In FIG. 16, management data are recorded on the disc used for recording/reproducing audio signal data, along with the audio information data corresponding to four musical numbers. In the addresses 0 and 1 of the management data area are recorded the leading end data number and the trailing end data number, respectively. In the example of FIG. 16, 1 and 4 are recorded as the values of the leading end data number and the trailing end data number, respectively. It is seen from this that four audio signal data from 1 to 4 are recorded on this disc.

In the addresses 5 to 8 of the management data area, data are recorded specifying where on the disc respective audio signal data are recorded, that is the address information (the information on the address storage position). This information on the address storage position is recorded in the reproducing order of audio signal data (the musical number playing order), such that the information on the address storage information for the audio signal data reproduced first and that on the address storage information for the audio signal data reproduced next are stored at the addresses 5 and 6, respectively. By using these management data, the playback order of the first and second musical numbers can be interchanged by interchanging the contents of the addresses 5 and 6 instead of by interchanging the actual recording positions of the audio signal data. In the management data area is set a reserve area for future extension. In this reserve area is recorded '0' data.

It should be noted that a certain encoding technique, referred to hereinafter as an old standard or an A-codec, was developed and a disc recording format was standardized using this technique. An encoding technique of higher efficiency, termed herein the new standard or B-codec, and which has expanded the codec-A, was subsequently developed. In such case, the signals encoded by the B-codec can be recorded on a disc of the same sort as that on which is recorded the signal by the A-codec. If the signal by the B-codec can be recorded as that by the A-codec, signal recording continuing for a longer time becomes possible on the disc, thus enabling the signal to be recorded with a higher sound quality to extend the scope of usage of the disc.

If, in the above-described embodiment of the present invention, the encoding method explained with reference to FIG. 9 is conceived as the A-codec, the encoding method employing the so-called variable length encoding technique, in which shorter code lengths are allocated to the quantized spectral signals occurring more frequently, while longer code lengths are allocated to those occurring less frequently, may be conceived as the B-codec. Similarly, an encoding method in which the transform block length in encoding an input signal is selected to be longer to relatively decrease the amount of the subsidiary information, such as the quantization fineness information or the normalization coefficient information per block, may be conceived as the B-codec. Also, the encoding method of encoding spectral signal components separately as tonal and non-tonal components as described above may be conceived as the B-codec. In addition, the combination of these high efficiency encoding methods may be conceived as the B-codec.

Figure 17:
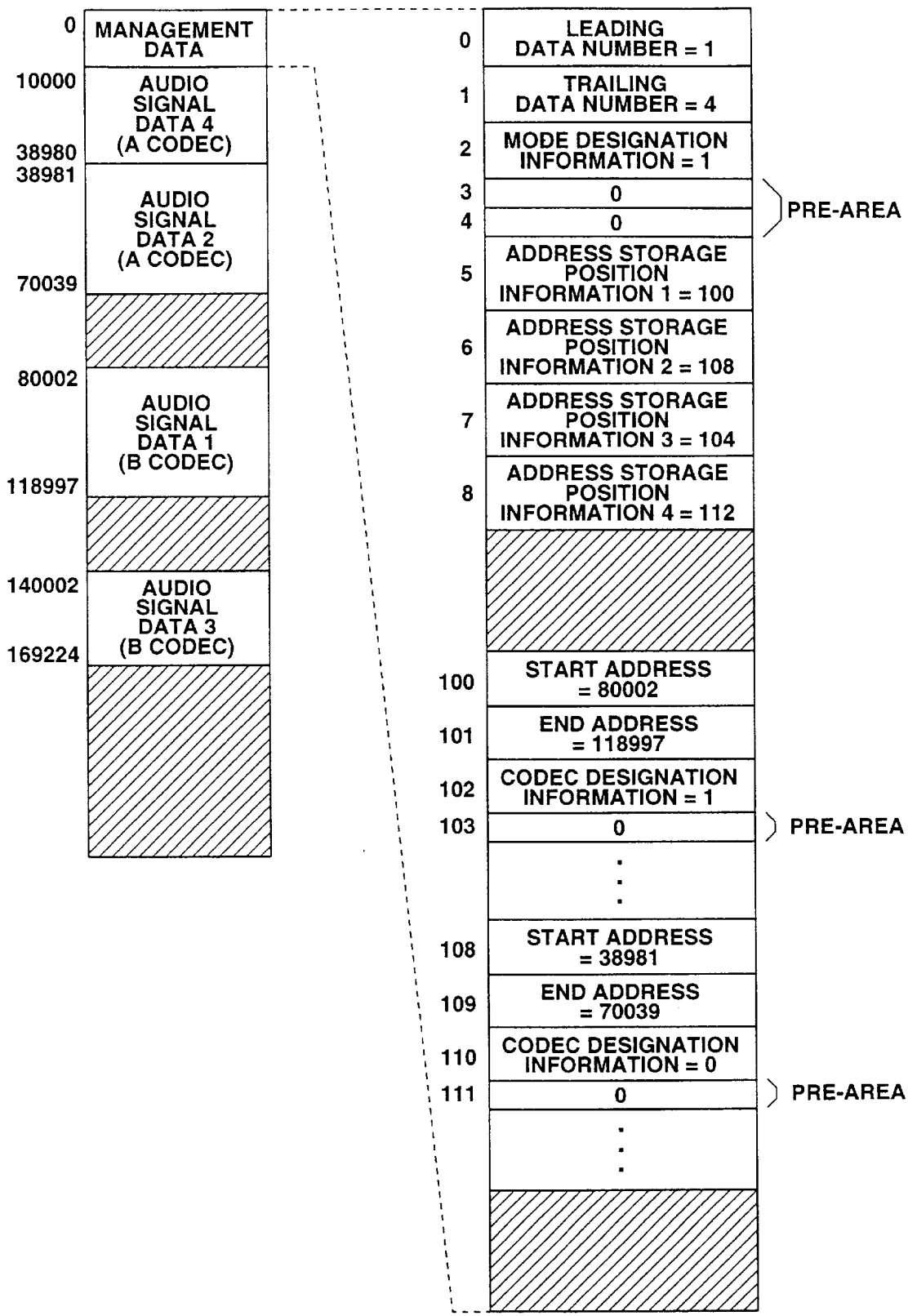
FIG. 17 illustrates the recording format when recording codestrings of the A codec and the B codec.

In recording signals encoded by the B-codec, which is an expansion of the A-codec as described above, on a disc, the mode designating information, shown in FIG. 17, is recorded at an address 2, which is used as a reserve area in a disc designed to cope only with the old standard (A-codec) shown in FIG. 16. If the mode designating information is 0 or 1, it indicates that the recording is made in accordance with the old standard (A-codec) or the new standard (B-codec), respectively. Therefore, if the value of the mode designating information is 1 at the time of disc reproduction, it is seen that the probability is high that recording on the disc is based on the new standard (B-codec).

If the signal by the B-codec is recorded on a disc, one of the preliminary areas provided next to the area for recording the address information (start address and end address) as shown in FIG. 16 is used as an area for the codec designating information. If the codec designating information is 0, it indicates that the audio signal data specified by the address information made up of the start and end addresses has been encoded in accordance with the new standard (B-codec), whereas, if it is 1, it indicates that the audio signal data encoded by the audio signal data designated by the address information has been encoded in accordance with the new standard (B-codec). This enables the audio signal data encoded by the A-codec and the audio signal data encoded by the B-codec to be recorded simultaneously on the same disc, while enabling the disc to be reproduced by a reproducing device adapted to cope also with the new standard (B-codec), referred to hereinafter as a new standard accommodating reproducing device.

However, a disc on which data of the A-codec and data of the B-codec have been recorded simultaneously cannot be discerned from its appearance as to whether recording has been made in accordance with the A-codec, that is the old standard, or in accordance with the codec, that is the new standard. Thus, the user is liable to reproduce the disc by a reproducing device compatible with the old standard. Since a reproducing device compatible with the old standard, constructed in accordance with the old standard, proceeds to reproduce signals recorded on the disc on the assumption that all recorded signals are based on the A-codec, without checking the contents of the address 2 which was set at all times at 0 as shown in FIG. 16, the signals cannot be reproduced, or a random hap-hazard noise is produced, thus distressing the user.

Under these circumstances, the present Assignee has proposed in Japanese Patent Application No. 8-228968 a method in which, if recording is made in accordance with the added standard (new standard), a signal advising the fact that part of recorded signals cannot be reproduced by reproducing means adapted to cope only with this standard is recorded in accordance with the old standard (A-codec) and in which, if the signal is reproduced by the old standard accommodating device, signals other than that recorded in accordance with the old standard are adapted to be non-reproducible to prevent the user from being dismayed or to prevent the noise from being produced. The Japanese Patent Application No. 8-228968 also teaches a method in which a message signal by the old standard (A-codec) is pre-recorded on the recording medium and, if recording is to be made by the new standard, the contents of the playback management information are acted upon so that, if the signal is reproduced by a device compatible with the old standard, the above message signal is reproduced for enabling the signal to be recorded on an inexpensive new standard accommodating reproducing device. The Japanese Patent Application No. 8-228968 also teaches a method in which, if the signal is to be reproduced by the old standard accommodating reproducing device, the message signal is reproduced in association with the signal portion recorded by a reproducing device compatible with the new standard for advising the user of the reproducing device compatible with the old standard, which musical number has been recorded by the old standard. That is, the Japanese Patent Application No. 8-228968 teaches a method in which the data that cannot be reproduced by the reproducing device compatible with the old standard itself cannot be reproduced by mistake and a message advising the user of the contents of the recording medium is transmitted to the user to prevent the user of the reproducing device compatible with the old standard from becoming dismayed.

Figure 18:
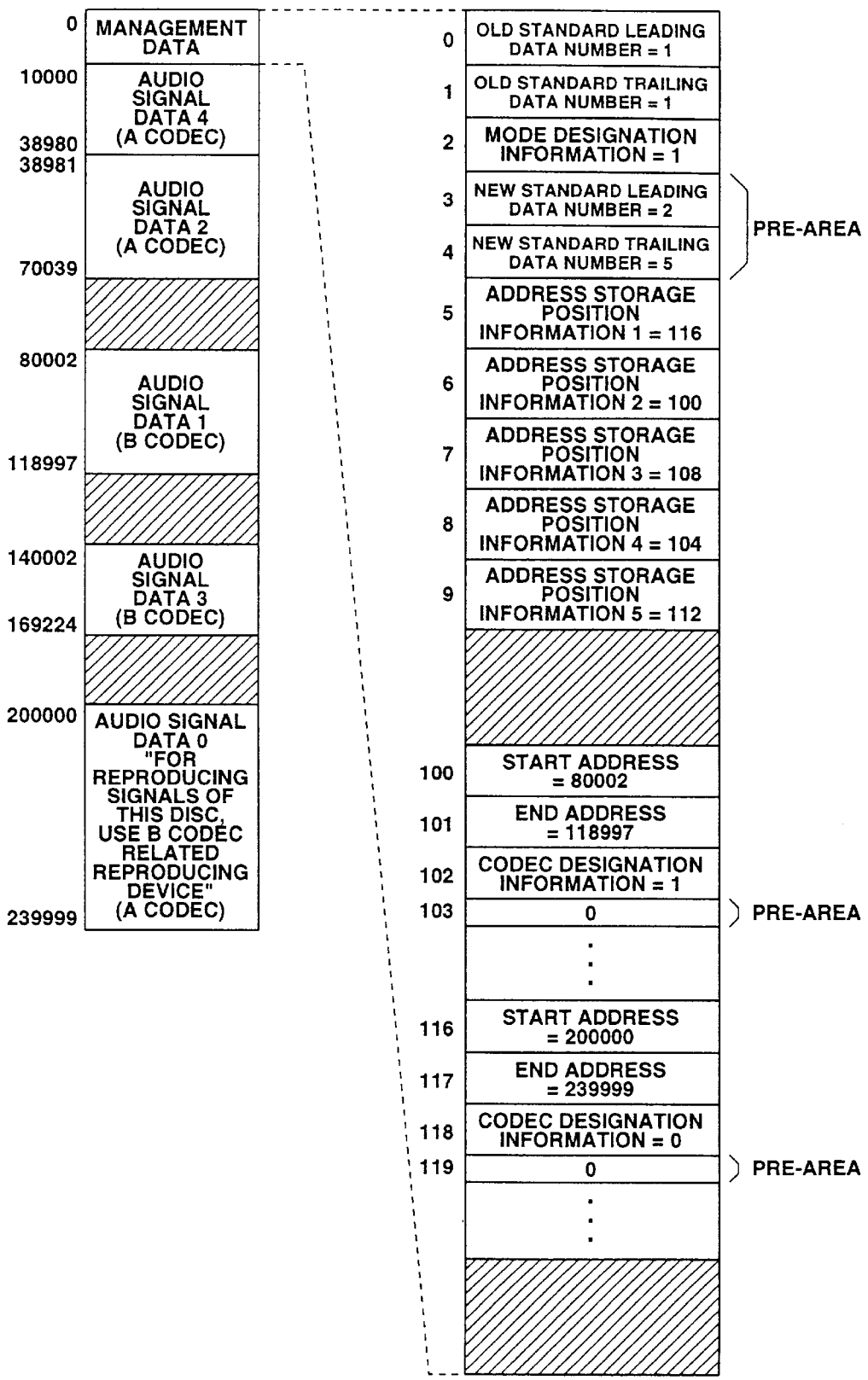
FIG. 18 illustrates a recording format which realizes prevention of erroneous reproduction of the B-codec by an old standard accommodating reproducing device in case of recording the codestrings of the A codec and the B codec.

FIG. 18 shows an example in which recording has been made on a disc by the method disclosed in the Japanese Patent Application No. 8-228968. In the example of FIG. 18, the management data pertinent to the new standard (B-codec) is recorded in separation from the management data pertinent to the old standard (A-codec).

In FIG. 18, the old standard accommodating reproducing device first reads the old standard leading data number at an address 0 and an old standard last data number at an address 1 (these numbers corresponding to the leading data number and the trailing data number of FIG. 16). In the example of FIG. 18, it can be construed from the old standard leading data number and the old standard last data number that the data recorded on the disc is only one beginning from the data number 1 and terminating at the data number 1. Then, the old standard accommodating reproducing device checks the contents of the address 5 (that is the address storage position information) in accordance with the old standard in order to be informed of the position of the address data in the management area. The old standard accommodating reproducing device then checks the contents of the address (address 118) specified by the address storage position information of the address 5 in order to be informed of the position (address 200000) in which the audio signal of the data number 0 is stored.

It should be noted that, while the reproducing device compatible with the old standard disregards the codec designating infonnation stated at an address 118, audio signals having the data number 0 are actually encoded by the A-codec in the method described in the above-mentioned Japanese Patent Application No. 8-228968 and hence there is raised no problem. The contents of the audio signals having the data number 0 are a message stating: "Please use B-codec accommodating reproducing device for reproducing signals of this disc." If this signal is reproduced, the user of the old standard accommodating machine is safeguarded against falling into a distressed state.

If a reproducing device accommodating both the old and new standards, that is a reproducing device accommodating the new standard, reproduces this disc, the contents of the mode designating infonnation at the address 2 of FIG. 18 are first checked in accordance with the new standard. This advises the new standard accommodating machine of the possibility that this disc has been recorded in accordance with the new standard 1 (B-codec). Based on the provision effective for the case of the mode designating information of 1, the new standard accommodating machine disregards the leading end data number at the address 0 of the new standard and the trailing end data number at the address 1 of the old standard and reproduces recorded signals on the assumption that, from the contents of the leading end data number of the new standard at the address 3 and the contents of the trailing end data number of the new standard at the address 4, data to be reproduced by this disc are four data from addresses 2 to 5. That is, the message for the old standard accommodating reproducing device (signals having the data number 0) is not reproduced in this case. However, by way of a caution to the disc user, the message can be reproduced even on the new standard accommodating device, in which case it is sufficient if the value of the leading end data number of the new standard at the address 3 is set to 1.

It is seen from the foregoing that, if the method disclosed in the above-mentioned Japanese Patent Application No. 8-228968 is used, not only the desired audio signal data recorded on the disc by the new standard accommodating device can be reproduced, but also only the message of caution concerning disc reproduction can be reproduced by the old standard accommodating reproducing device, thus preventing the user from unnecessarily falling into a distressed state.

However, it is not the signal as such but the message signal that can be reproduced with the above-described method by the old standard accommodating reproducing device.

Thus, with the present embodiment, the following technique is used so that, if signals by the A-codec and signals of the B-codec arc recorded on the same disc, the signals of the A-codec can be reproduced even by the old standard accommodating reproducing device, while both the signals by the A-codec and those of the B-codec can be reproduced if the new standard accommodating reproducing device is used.

On the other hand, if signals of different standards, that is signals of the old standard (A-codec) and signals of the new standard (B-codec), are recorded together in the same disc, the recording area allocated to these two signals is decreased, thus possibly lowering the quality of recorded or reproduced signals (the sound quality in case of audio signals). The present embodiment renders it possible to suppress this lowering of the sound quality.

To this end, the following measures are used in the present embodiment. That is, if a codestring is prescribed so that long-time signal recording/reproduction is possible if the number of channels is small, as in the recording format shown in FIG. 11 or if monaural signals are recorded as in FIG. 10, a number of bits smaller than the total number of bits that can be allocated to each frame is allocated to the small number of channels. Stated differently, for the A-codec, a number of bits smaller than the total number of bits allocated to each frame is used for encoding so that a void recording area will be produced in a frame and signals not reproduced by the old standard accommodating device, that is signals of the B-codec, are recorded in the resulting void recording area in the frame, for enabling long-time mode multi-channel recording/reproduction (recording/reproduction of both A-codec and B-codec signals). For producing the above-mentioned void recording area, the channel encoded by the A-codec encoding method can be narrowed in bandwidth, in addition to adjusting the number of allocated bits as described above.

If the A-codec and B-codec signals are encoded with the number of bits smaller than the number allocable to a frame, as described above, the number of bits allocated for encoding the A-codec is reduced as compared to the case in which the total bits are allocated for encoding the A-codec, so that the reproduced sound by the old standard accommodating device is lowered in sound quality. However, since the present embodiment employs a method higher in encoding efficiency than the A-codec encoding method, such as a method of using a long-time transform block for encoding the B-codec, the number of bits used for encoding the B-codec is relatively small to increase the number of bits that can be used for encoding the A-codec, thus suppressing deterioration in sound quality.

That is, by the present embodiment, by encoding signals of a channel not reproduced by the old standard accommodating reproducing device, that is B-codec signals, by a method more efficient than when encoding signals of a channel reproduced by the old standard accommodating reproducing device (A-codec signals), it becomes possible to minimize the lowering of the sound quality otherwise caused by reducing the number of bits allocated to signals reproduced by the old standard accommodating reproducing device as a result of using multiple channels.

The methods for actually improving the encoding efficiency may be enumerated by use of long-time transform blocks or of the variable length codes, separation of tonal components and so forth. These methods are encompassed by the method of the present invention. For simplifying the description, the case of using the long-time transform blocks or of the variable length codes and separation of tonal components is hereinafter explained.

Figure 19:
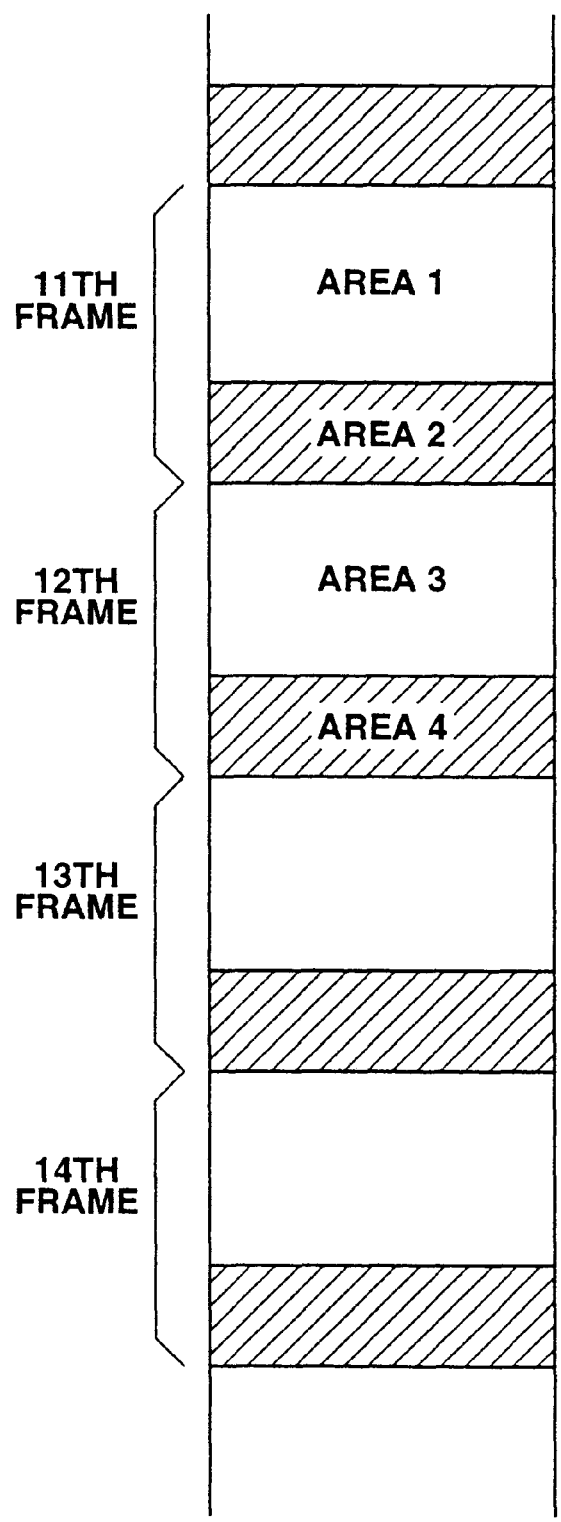
FIG. 19 illustrates a codestring structure in which signals of the A codec and the B codec are arranged in a frame.

FIG. 19 shows an example of a codestring employing the above-described method of the present invention.

In the example of FIG. 19, each frame composed of a pre-set number of bits is separated into two areas. Specifically, in areas 1 and 3 of FIG. 19, signals of a channel (L+R)/2, encoded by the above A-codec encoding method, are recorded, whereas, in areas 2 and 4, shown by hatching, signals of a channel (L−R)/2, encoded by the above B-codec encoding method, are recorded, while areas 2 and 4 correspond to the areas which could otherwise be void.

The above-described A-codec encoding method is the encoding method explained with reference to FIG. 9. The B-codec encoding method may, for example, be a method of FIG. 13 used for encoding signals transformed into spectral component signals with a transform length twice that for the A-codec. The transform length for the A-codec is twice as long as the B-codec transform block length. Therefore, the code corresponding to the transform block are recorded across two frames.

In the example of FIG. 19, the fixed length encoding method is used for the A-codec. Therefore, the number of bits used in a codestring obtained by the above-mentioned A-codec encoding method (referred to hereinafter as the A-codec codestring) can be calculated easily. If the number of bits used by the A-codec can be calculated, the leading position of the codestring obtained by the above-mentioned B-codec encoding method (referred to hereinafter as the B-codec codestring) can be calculated easily. Alternatively, the B-codec codestring can be adapted for beginning from the trailing end of a frame. In this case, the leading position of the B-codec codestring can be known easily if a variable-length encoding method, for example, is used as the A-codec encoding method. If the leading position of the B-codestring can be calculated easily in this manner, it becomes possible for the reproducing device accommodating both the A-codec and the B-codec (new standard accommodating reproducing device) to process both of the codestrings promptly by parallel operation, thus enabling high-speed processing.

Also, in the embodiment of FIG. 19, since the A-codec encoding method uses the fixed-length encoding method, the number of bits used by the codestring obtained by the A-codec encoding method (A-codec codestring) can be calculated easily. If the number of bits used by the A-codec codestring can be calculated in this manner, the leading end position of the codestring by the B-codec (B-codec codestring) can easily be determined. Alternatively, the B-codec codestring can be designed to begin at the trailing end of a frame. In this case, the leading end of the B-codes codestring can be known easily even if the variable-length encoding method, for example, is used as the A-codec encoding method. If the leading end position of the B-codec codestring can be calculated easily in this manner, it becomes possible for the reproducing device accommodating both the A-codec and the B-codec (new standard accommodating reproducing device) to process both of the codestrings promptly by parallel operation thus enabling high-speed processing.

If the A-codec encoding method contains the information on the number of encoding units, as in FIG. 9, and the bandwidth of the channel encoded by the A-codec encoding method is narrowed for securing an area for recording signals of other channels (void recording area) as described above, the quantization fineness data or the normalization coefficient data on the high frequency side, for example, can be omitted conveniently. In this case, the number of bits used for encoding by the A-codec encoding method can be calculated easily.

In the above-described embodiment of FIG. 19, the (L+R)/2 channel signals are recorded as an A-codec codestring, whereas the (L−R)/2 channel signals are recorded as a B-codec codestring. Thus, if only the area having the A-codec signals, for example, recorded therein, is reproduced and decoded, (L+R)/2 monaural signals can be reproduced, whereas, if both an area having A-codec signals recorded therein and an area having B-codec signals recorded therein are reproduced and decoded, and the sum of the two decoded signals is found, the right (R) channel signals can be reproduced. On the other hand, if the difference between the two decoded signals is found, the left (L) channel signals can be reproduced, thus enabling stereo reproduction.

The old standard accommodating reproducing device disregards, in the recording medium having the codestring of FIG. 19 recorded thereon, the above-described area encoded by the B-codec encoding method, so that monaural signals can be reproduced from the recording medium having the above-mentioned codestring recorded thereon. On the other hand, stereo signals can be reproduced from a recording medium, having recorded thereon the codestring shown in FIG. 19, by a reproducing device carrying both a A-codec decoding circuit and a B-codec decoding circuit (reproducing device accommodating the new standard). Thus, if, after the old standard accommodating reproducing device has come into widespread use, the new standard accommodating reproducing device has introduced the encoding method shown in FIG. 19, as a standard for stereo reproduction, the old standard accommodating reproducing device can reproduce monaural signals. Meanwhile, since the decoding circuit for decoding the A-codec codes can be implemented by hardware of a relatively small scale, the reproducing device carrying such a decoding circuit can be fabricated at a low cost.

Figure 20:
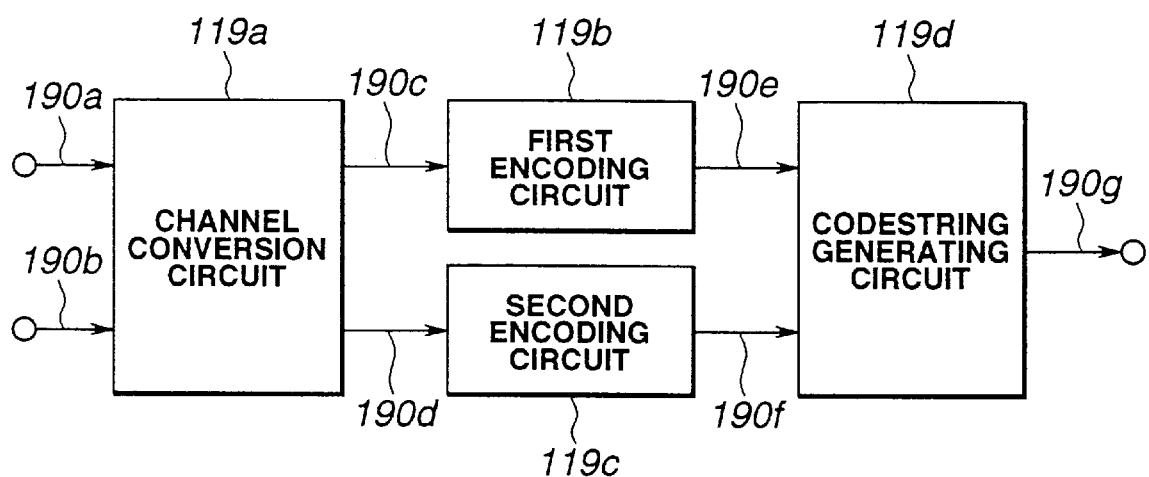
FIG. 20 is a block circuit diagram showing an illustrative structure of a signal component encoding circuit configured for generating a codestring in which signals of the A codec and the B codec are arranged in a frame.

FIG. 20 shows an illustrative structure of an encoding circuit for generating a codestring of FIG. 19 using the above-described method of the present invention.

In FIG. 20, L-channel input signal 190a and a R-channel input signal 190b are converted by a channel conversion circuit 119a into a signal 190c corresponding to (L+R)/2 and to a signal 190d corresponding to (L−R)/2, respectively. The (L+R)/2 signal 190c and the (L−R)/2 signal 190d are sent to a first encoding circuit 119b and to a second encoding circuit 119c, respectively.

The first encoding circuit 119b is equivalent to the signal component encoding circuit 111b of FIG. 2 having the configuration of FIG. 4. To this first encoding circuit 119b is applied the above-described A-codec encoding method. On the other hand, the second encoding circuit 119c has a transformation block length twice as long as the first encoding circuit 119b, and is equivalent to the signal component encoding circuit 111b, having the configuration of FIG. 14. To this second encoding circuit 119b is applied the above-described B-codec encoding method. The A-codec codestring 190e of the first encoding circuit 119b and the B-codestring 190f of the second encoding circuit 119c are both sent to a codestring generating circuit 1119d.

This codestring generating circuit 119d generates a codestring, shown in FIG. 19, from the codestrings 190e and 190f to output the generated codestring as an output codestring signal 190g.

Figure 21:
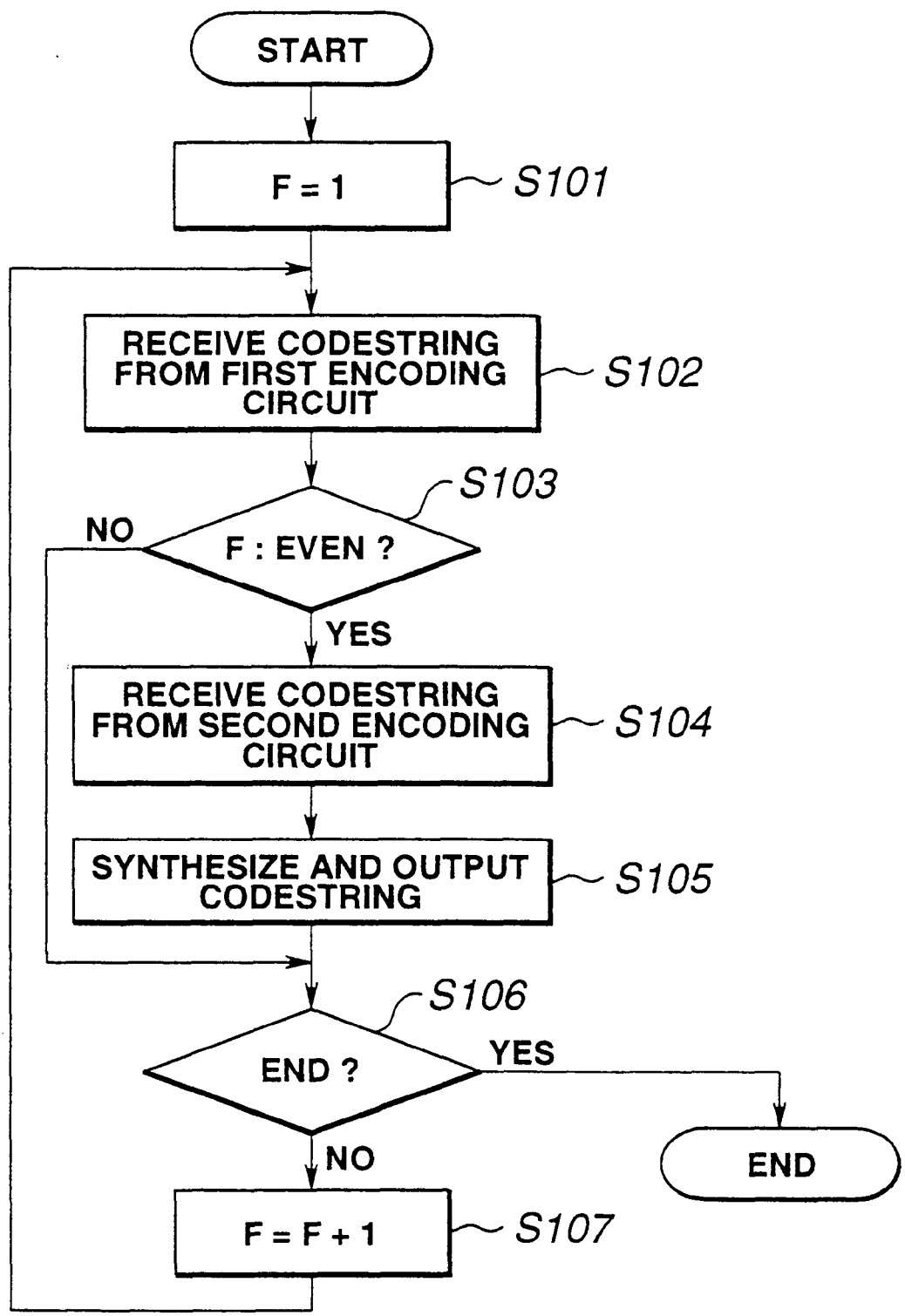
FIG. 21 is a flowchart for illustrating a processing example of generating a codestring in which signals of the A codec and the B codec are arranged in a frame.

FIG. 21 shows the processing flow for the codestring generating circuit 119d of FIG. 20 to generate a codestring of FIG. 19.

In FIG. 21, the frame number F is initialized to 1 at step S101. At the next step S102, an A-codec codestring 190e is received from the first encoding circuit 119b. At step S103, it is judged whether or not the frame number F is odd or even. If the frame number is even, processing transfers to step S104 and, if the frame number is odd, processing transfers to step S106.

At step S104, a B-codec codestring 190f from the second encoding circuit 119c is received. At the next step S105, the above-mentioned codestring of FIG. 19 is synthesized from the codestrings 190e and 190f.

At step S106, it is checked whether or not processing for all frames has come to a close. If the result is YES, the processing of FIG. 21 is terminated and, if otherwise, the frame number F is incremented by one at step S107 before processing reverts to step S102 to repeat the above processing.

In the processing of FIG. 21, the frame number F begins at 1. However, since the processing unit of encoding method for the B-codec is two frames, which is twice that used in the A-codec encoding method, the codestring is generated every two frames.

Figure 22:
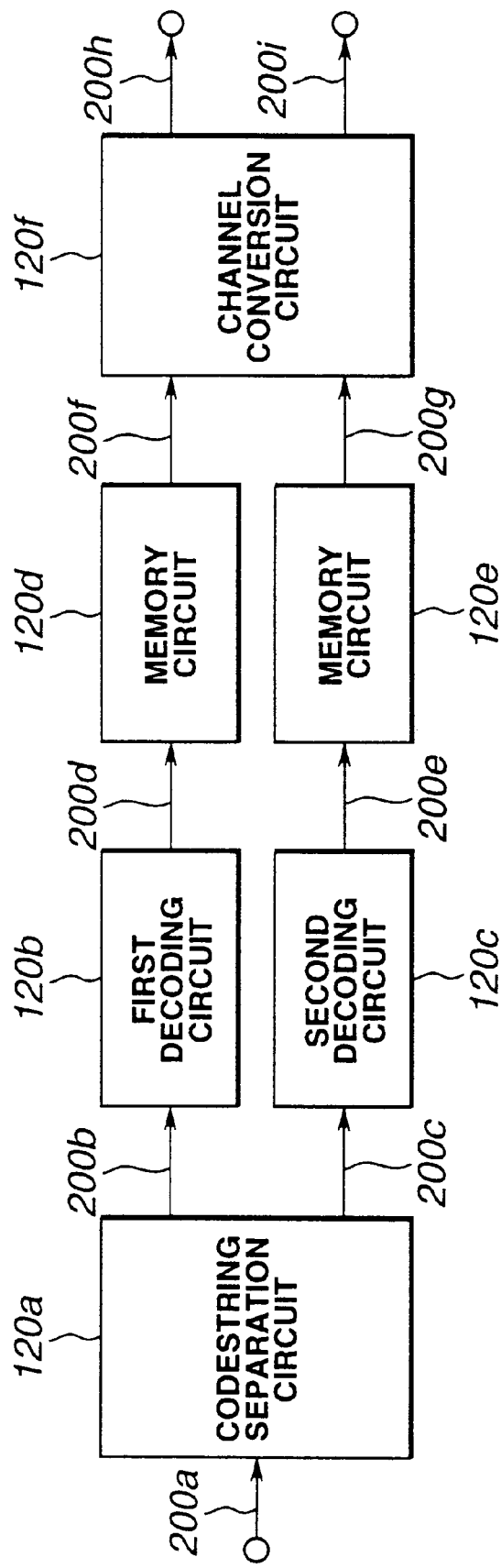
FIG. 22 is a block circuit diagram showing an illustrative structure of a signal component decoding circuit configured for generating a codestring in which signals of the A codec and the B codec are arranged in a frame.

FIG. 22 shows an illustrative structure of a decoding circuit of the new standard accommodating reproducing device adapted for decoding the codestring of FIG. 19 generated by the above-described encoding method of the present invention.

In FIG. 22, an input codestring 200a, which is a codestring of FIG. 19, is separated by a codestring separation circuit 120a into the A-Codec codestring 200b and a B-codec codestring 200c, which are sent to a first decoding circuit 120b and a second decoding circuit 120c, respectively.

The first decoding circuit 120b is equivalent to the signal component decoding circuit 114b of FIG. 5 and operates for decding the A-codec codes. The second decoding circuit 120c, having a conversion block length twice that of the second decoding circuit 120c, is equivalent to the signal component decoding circuit 114b having the configuration of FIG. 5 and operates for decoding the B-codec codes. A signal 200d decoded by the first decoding circuit 120b is equivalent to the signal (L+R)/2 190c, whilst a signal 200e decoded by the second decoding circuit 120c is equivalent to the signal (L−R)/2 190d.

Since the signal (L+R)/2 200d and the signal (L−R)/2 200e are of different conversion block lengths and hence are of different processing time delays, the signal (L+R)/2 200d from the first decoding circuit 120b and the signal (L−R)/2 200e from the second decoding circuit 120c are sent to a memory circuit 120d and to a memory circuit 120e, respectively, where the above-mentioned processing time delays are absorbed. The signal (L+R)/2 200d and the signal (L−R)/2 200e, passed through the memory circuits 120d and 120e, are sent to a channel conversion circuit 120f.

This channel conversion circuit 120f sums the signal (L+R)/2 200f and the signal (L−R)/2 200g to generate a L-channel signal 200h, while subtracting the signal (L−R)/2 200g from the signal (L+R)/2 200f to generate a R-channel signal 200i to output these L and R channel signals.

Figure 23:
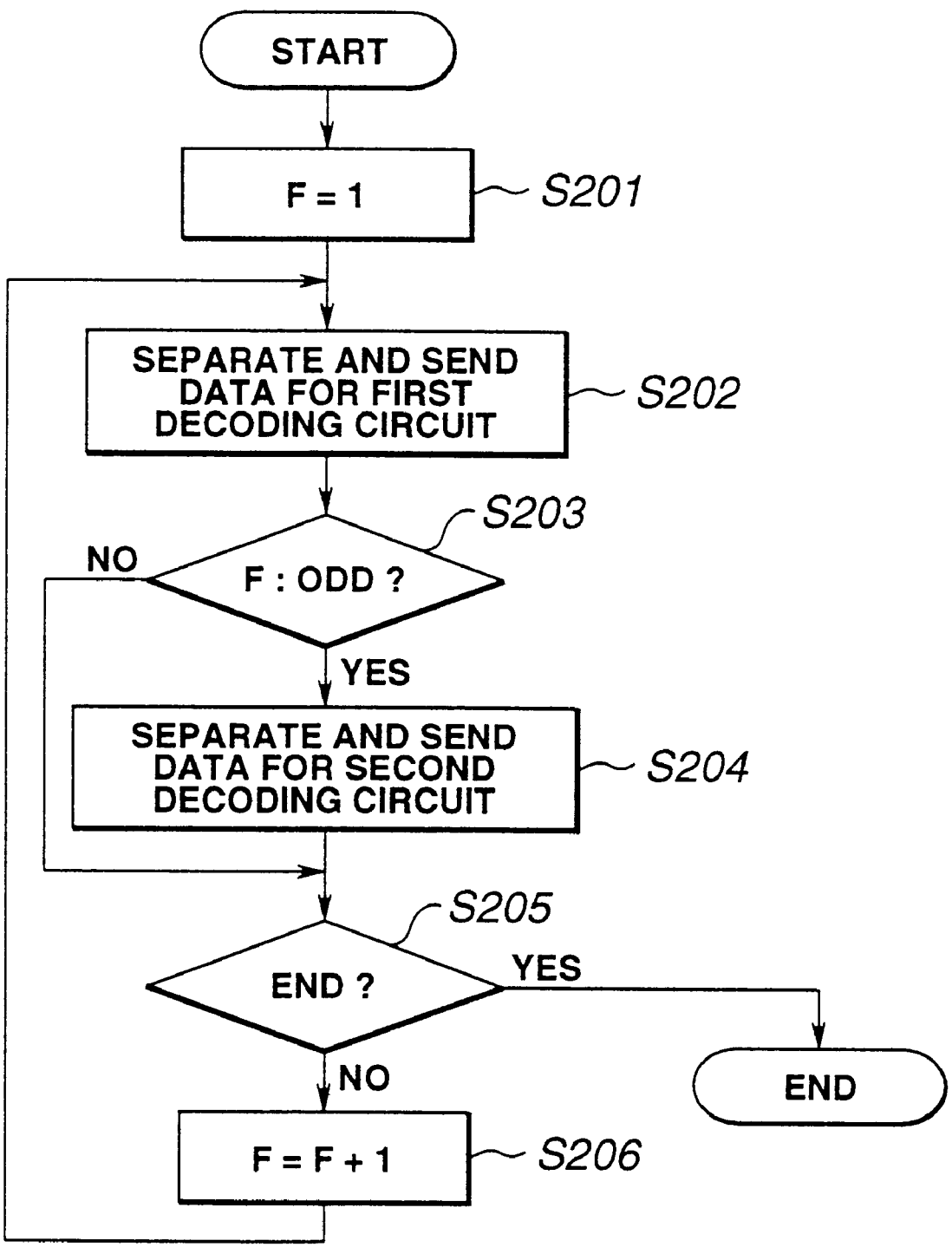
FIG. 23 is a flowchart for illustrating a processing example of decoding a codestring in which signals of the A codec and the B codec are arranged in a frame.

FIG. 23 shows the processing flow when the codestring separation circuit 120a separates the codestring of FIG. 19.

In FIG. 23, the frame number F1 is initialized at step S201 to 1. At step S202, the A-codec codestring to be sent to the first decoding circuit 120b is separated and sent. At step S203, it is checked whether or not the frame number F is odd or even. If the frame number F is not odd, processing transfers to step S205 and, if otherwise, processing transfers to step S204.

At step S204, the B-codec codestring for sending to the second decoding circuit 120c is separated and sent.

At step S205, it is checked whether or not processing for all frames has come to a close. If the result is YES, the processing of FIG. 23 is terminated and, if otherwise, the frame number F is incremented by one at step S206 before processing reverts to step S202 to repeat the above processing.

In the processing of FIG. 23, the frame number F begins at 1. However, since the processing unit of the encoding method for the B-codec is two frames, which is twice that of the A-codec encoding method, the codestring is separated every two frames.

In the above description of the preferred embodiment, only signals of an additional channel (B-codec signals) are recorded in an ordinarily void recording area of each frame. As a modification, if the contents of dummy data recorded in a void area are set to '0', it is also possible to record the information specifying the channel structure, for example, in the ordinarily void recording area. If the channel stricture is recorded in a frame, it becomes possible to effect a standard extension in which the number of channels is increased without modifying the contents recorded in the so-called table-of-contents (TOC) area in case of using a disc as a recording medium. In the above-described embodiment, each frame is divided into an area for A-codec and an area for B-codec. In this case, it becomes necessary to record in the TOC the information specifying the fact that such recording has been made. If the information specifying the channel structure is recorded in the ordinarily void recording area as in the present modification, it is unnecessary to modify the TOC contents. Of course, this method can be used in conjunction with other methods of the present invention as described above and, by so doing, high efficiency encoding can be advantageously realized without modifying the TOC portion.

The present modification employing this method is hereinafter explained. For simplifying the explanation, it is assumed that the transform block has the same length in the A-codec encoding method and in the B-codec encoding method and that data of a transform block of the B-codec encoding method is encoded in one frame. Of course, the method of the present invention can be applied to a case in which the transform block length of the B-codec encoding method is longer than that of the A-codec encoding method.

Figure 24:
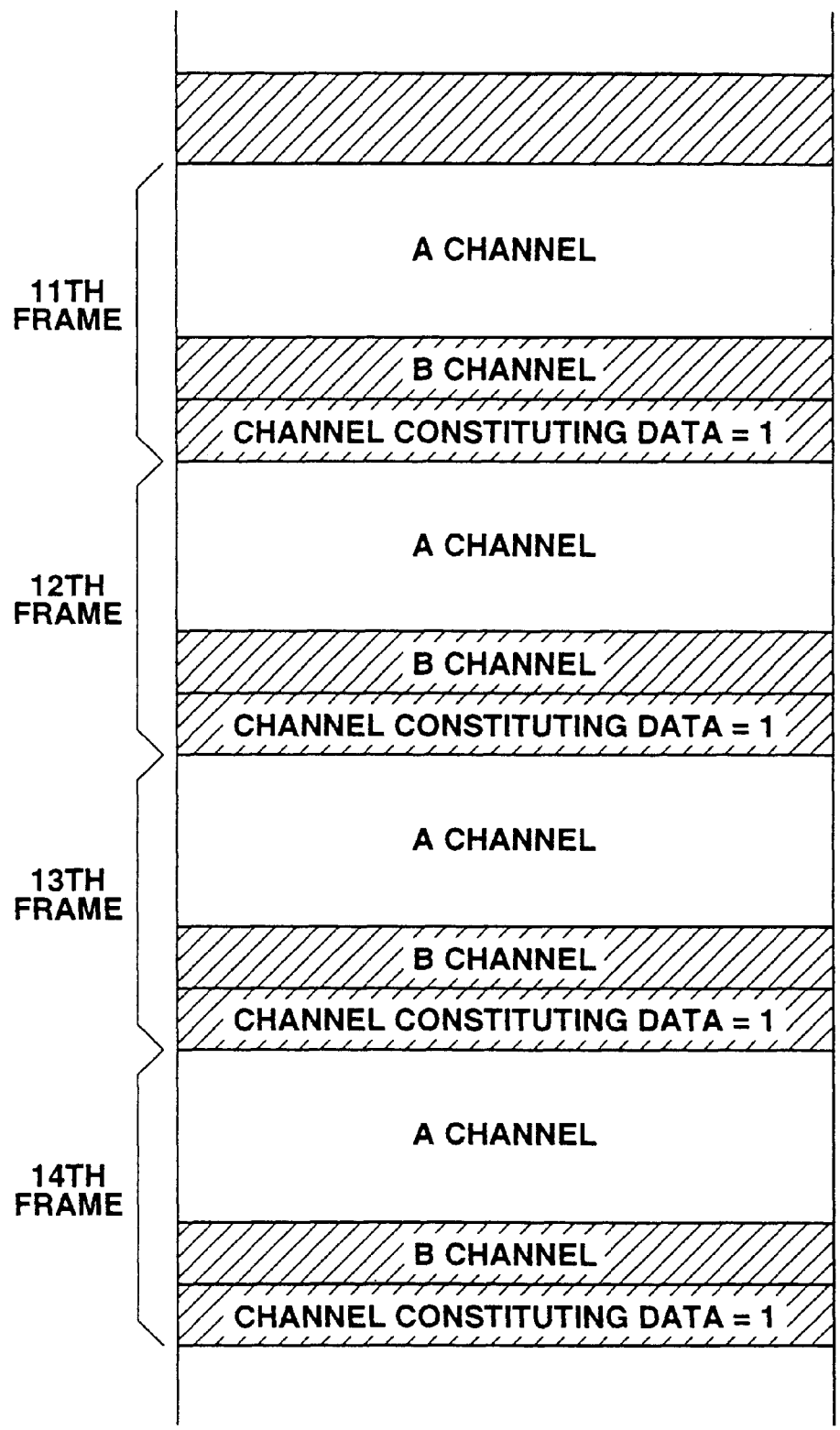
FIG. 24 illustrates the structure of a codestring in which channel constituting data are arranged in a frame.

FIG. 24, shows an illustrative example of a codestring associated with the modification.

In this modification, only audio signals of one channel of (L+R)/2 are recorded in the A-codec channel (tenned A-channel) as in FIG. 19, whereas, in the void recording area, the channel constituting data is recorded along with the (L−R)/2 channel in the void recording area.

By so doing, L and R stereo reproduction from the two channels of (L+R)/2 and (L−R)/2 becomes possible by the new standard accommodating reproducing device without modifying the TOC contents. In the example of FIG. 24, in the embodiment of FIG. 24, a space for recording the channel constituting data (flag) is provided next to the (L−R)/2 signal, and the channel constituting data is set to 1. If the channel constituting data is 0, no vacant recording area is generated.

Figure 25:
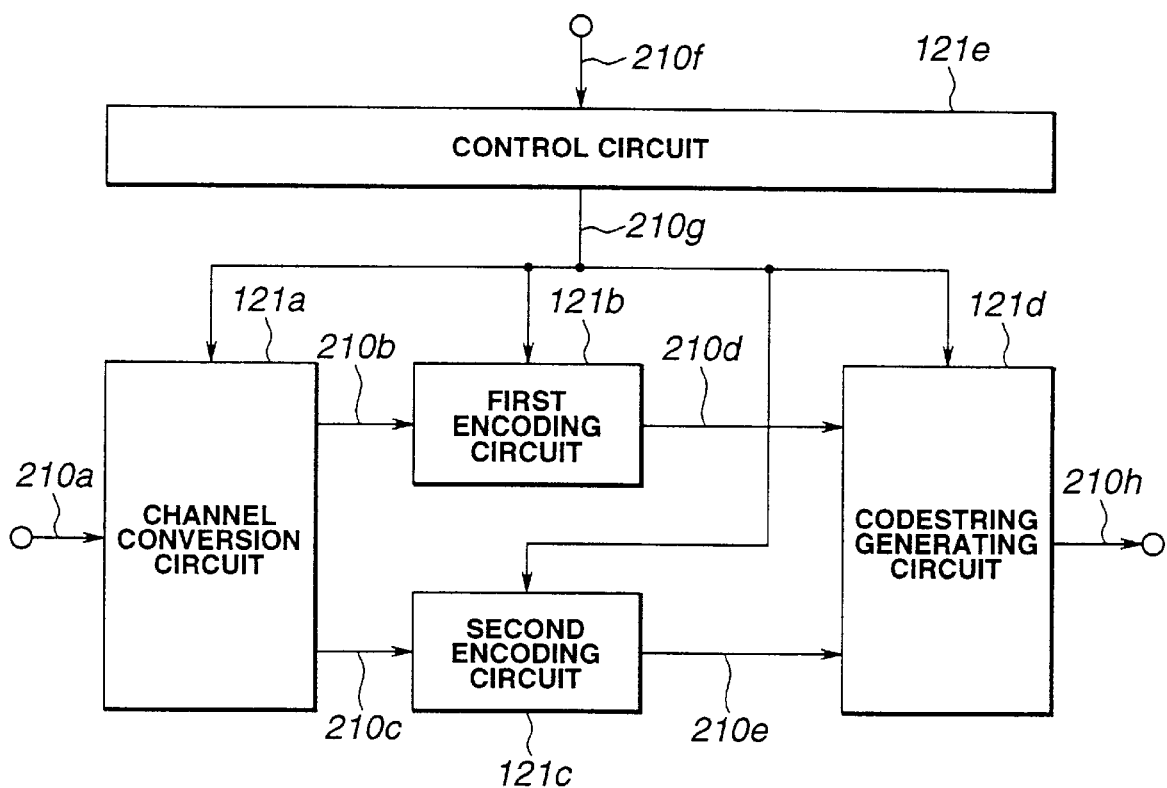
FIG. 25 is a block circuit diagram showing an illustrative structure of a signal component encoding circuit configured for generating a codestring in which the channel constituting data are arranged in a frame.

FIG. 25 shows an embodiment of an encoding circuit for generating the codestring shown in FIG. 24 embodying the present invention.

In FIG. 25, an input signal 210a is comprised of L- and R-channel signals and converted by a channel conversion circuit 210a into a signal (L+R)/2 210b and a signal (L−R)/2 210c which are sent to a first encoding circuit 121b and a second encoding circuit 121c, respectively.

The first encoding circuit 121b is equivalent to the signal component encoding circuit 111b of FIG. 2 having the structure shown in FIG. 4. To this first encoding circuit 121b is applied the above-mentioned A-codec encoding method. The A-codec codestring 210d of the first encoding circuit 121b and the B-codec codestring 210e of the second encoding circuit 121c are both supplied to a codestring generating circuit 121d.

This codestring generating circuit 121d generates a codestring shown in FIG. 24, from the codestrings 210d and 210e, to output the generated codestring as an output codestring signal 210h.

The arrangement of FIG. 25 includes a control circuit 121e. This control circuit 121e is responsive to an input signal 210f designating the encoding mode to generate a control signals 210g which controls components from the codestring separation circuit 120a to the codestring generating circuit 121d to generate the codestring of FIG. 24 as will be explained subsequently with reference to the flowchart of FIG. 26.

Figure 26:
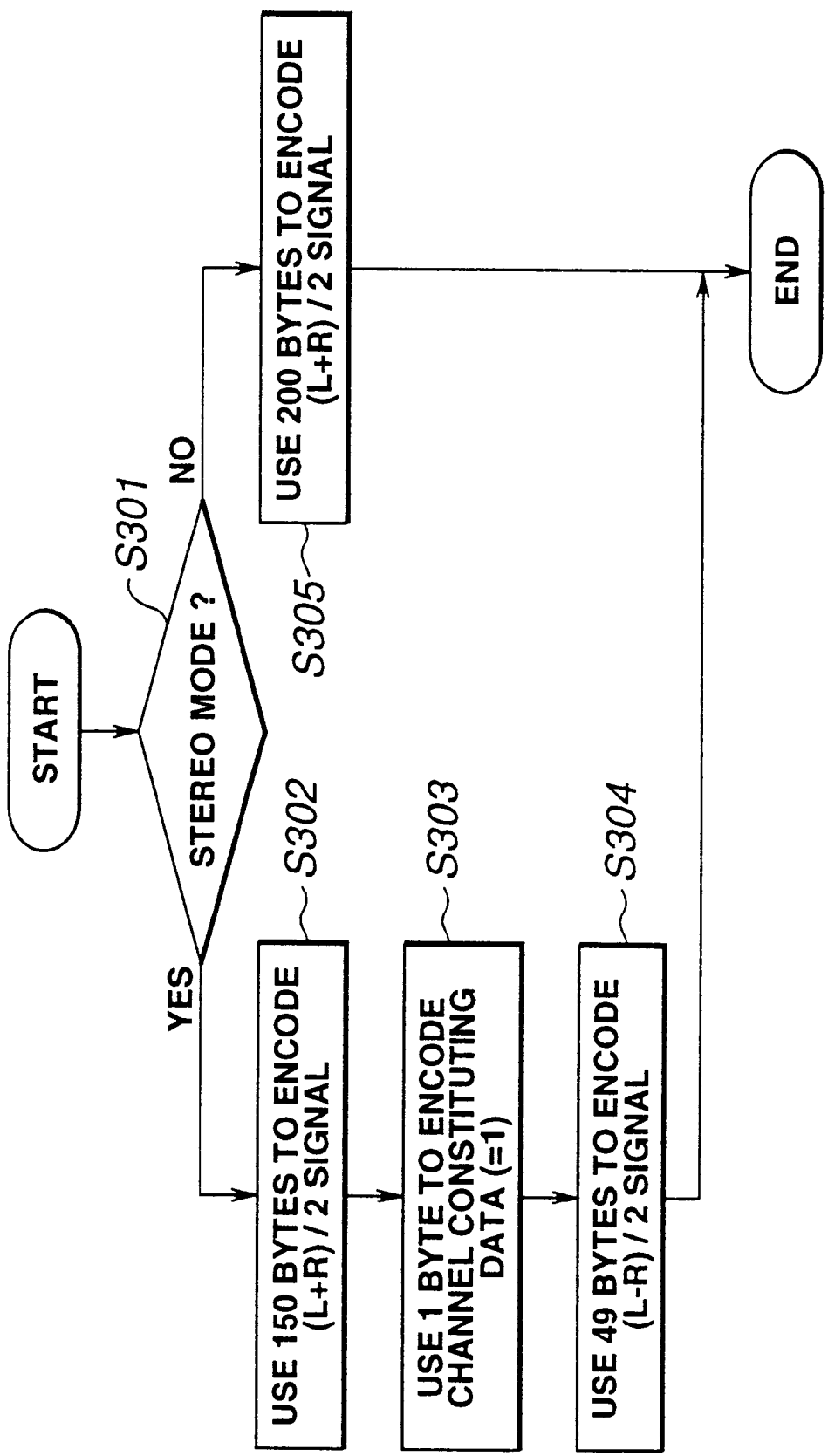
FIG. 26 is a flowchart for illustrating a processing example of the signal component encoding circuit configured for generating a codestring in which the channel constituting data are arranged in a frame.

FIG. 26 shows the processing flow when generating a codestring shown in FIG. 24 based on the control signals 210g. Meanwhile, it is assumed that 200 bytes, for example, are allocated per frame and that, if the recording/reproduction is to occur stereophonically, as described above, 150 bytes, 49 bytes and 1 byte are allocated to the signal (L+R)/2, signal (L−R)/2 and to the channel constituting data, respectively.

In FIG. 26, it is checked at step S301 whether or not the recording/reproduction is to occur stereophonically. If the mode designating signal of FIG. 25 indicates a stereo mode, processing transfers to step S302 et seq. and, if otherwise, to step S305.

At step S302, the above signal (L+R)/2 is encoded with the A-codec, using 150 bytes. At the next step S303, one byte is used to generate the channel constituting data (=1) and to encode the generated data. Then, at step S304, the signal (L−R)/2 is encoded by the B-codec, using 49 bytes.

On the other hand, the signal (L+R)/2 is encoded at step S305 using one byte. Then, at step S304, 49 bytes are used to encode the signal (L−R)/2 by the B-codec.

At step S305, 200 bytes are used to encode the signal (L+R)/2 by the A-codec.

Figure 27:
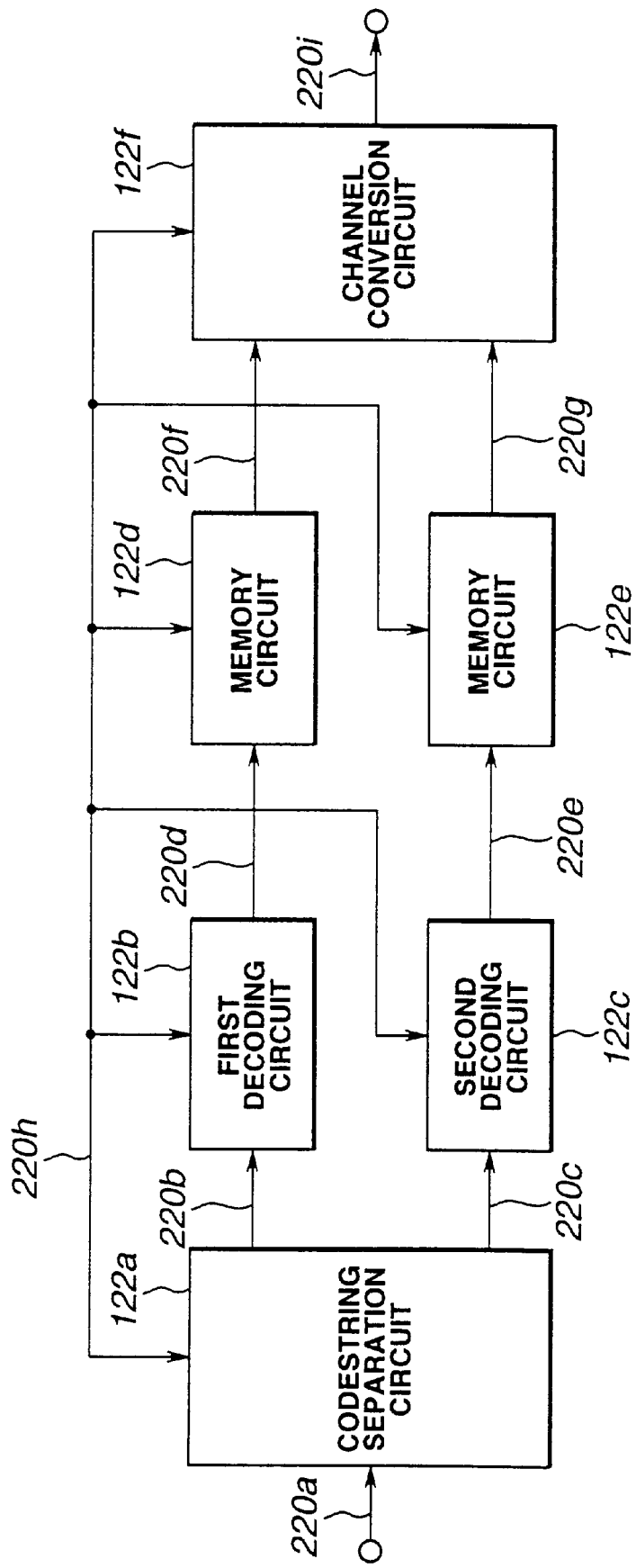
FIG. 27 is a block circuit diagram showing an illustrative structure of a signal component decoding circuit configured for generating a codestring in which the channel constituting data are arranged in a frame.

FIG. 27 shows an embodiment of a decoding circuit of a standard accommodating reproducing device adapted for decoding the codestring shown in FIG. 24.

In FIG. 27, an input codestring 220a, as a codestring of FIG. 24, is split by a codestring separating circuit 122a into a codestring signal (L+R)/2 220b and a codestring signal (L−R)/2 220c. The codestring signal (L+R)/2 220b and the codestring signal (L−R)/2 220c correspond to the codestring signal (L+R)/2 210d and the codestring signal (L−R)/2 210e, respectively. The codestring signal (L+R)/2 220b and the codestring signal (L−R)/2 220c are sent to a first decoding circuit 122b and to a second decoding circuit 122c, respectively.

The first decoding circuit 122b corresponds to the signal component decoding circuit 114b of FIG. 5, having the stricture of FIG. 7, and decodes the codes of the A-codec. The second decoding circuit 122c corresponds to the signal component decoding circuit 115b of FIG. 5, having the structure of FIG. 15, and decodes the codes of the B-codec. The codestring signal (L+R)/2 220d, decoded by the first decoding circuit 122b, corresponds to the codestring signal (L+R)/2 210b, while the codestring signal (L+R)/2 220e, decoded by the first decoding circuit 122c, corresponds to the codestring signal (L+R)/2 210c.

There is a difference in processing time delay between the codestring signal (L+R)/2 220d and the codestring signal (L+R)/2 220e. Thus, the signal (L+R)/2 220d from the first decoding circuit 122b and the signal (L−R)/2 220e from the second decoding circuit 122c are sent to a memory circuit 122d and to a memory circuit 122e, respectively, where the above-mentioned processing time delays are absorbed. The signal (L+R)/2 220f and the signal (L−R)/2220g, passed through these memory circuits 220f, 220g, are sent to a channel conversion circuit 122f.

This channel conversion circuit 122f sums the signal (L+R)/2 220f and the signal (L−R)/2 220e to generate a L-channel signal, while subtracting the signal (L−R)/2 220g from the signal (L−R)/2 220f to generate a R-channel signal to output these L and R channel signals.

In the arrangement of FIG. 27, the codestring separating circuit 122a separates the channel constituting data from the input codestring 220a. If the channel separating data corresponds to the stereo mode, the components of codestring separating circuit 122a from the codestring separating circuit 122a to the channel conversion circuit 122f generate a control signals 220h for performing the above-mentioned decoding operation to send the generated control signals to the respective components. If the channel separating data corresponds to the monaural mode, the codestring separating circuit 122a outputs only the codestring signal (L+R)/2 220b to reproduce the monaural signals by the configuration downstream of the first decoding circuit 122b.

Figure 28:
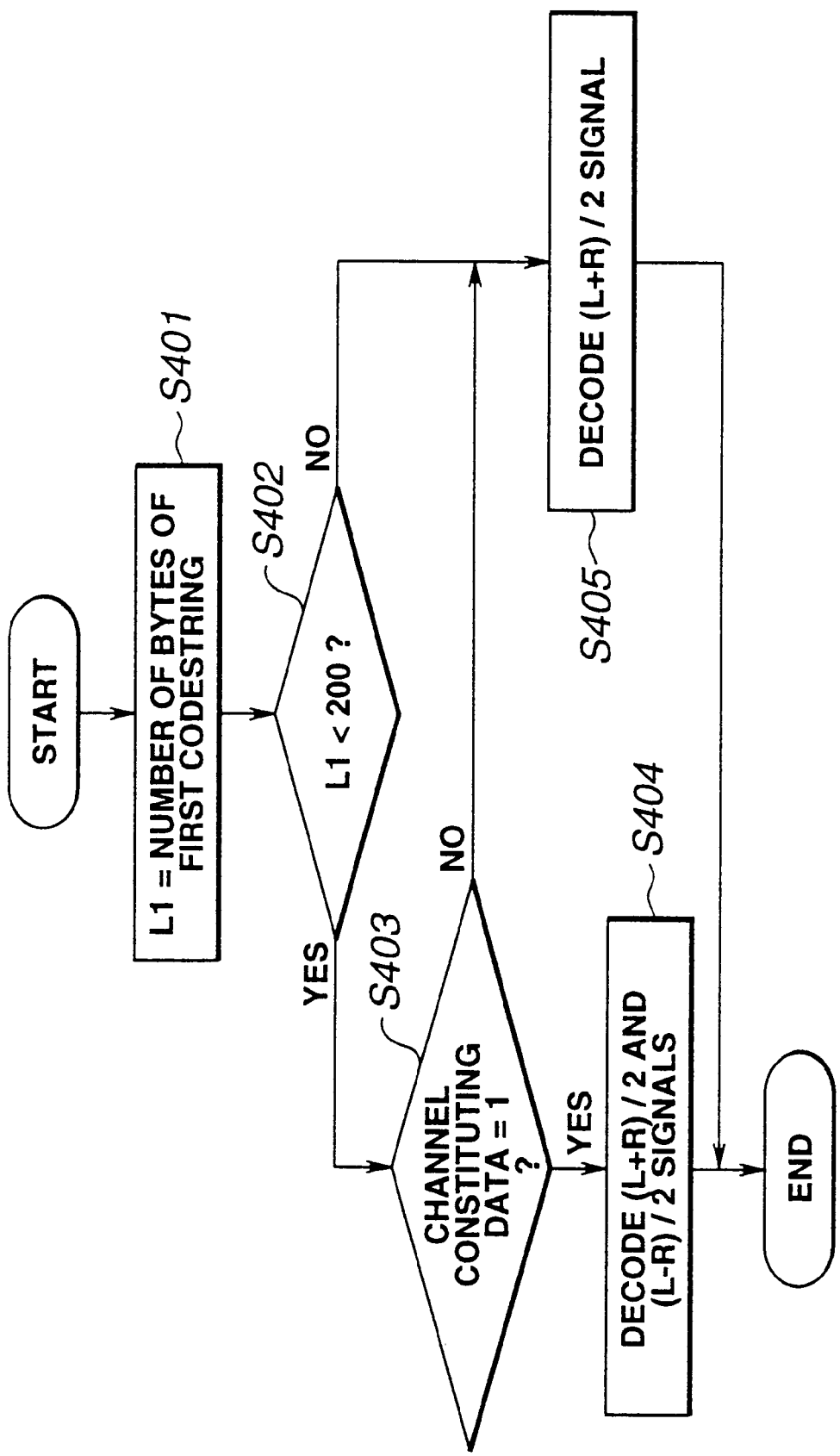
FIG. 28 is a flowchart for illustrating a processing example of the signal component decoding circuit configured for generating a codestring in which the channel constituting data are arranged in a frame.

FIG. 28 shows the flow in which the codestring separating circuit 122a of the configuration of FIG. 27 generates the control signals 220g to control the respective components.

In FIG. 28, the number of bytes L1 of the first codestring 220a, that is the codestring signal (L+R)/2 220b, is found at step S401 by calculations. At step S402, it is checked whether or not the number of bytes L1 is smaller than 200. If L1 is smaller than 200, processing transfers to step S403 ff, whereas, if L1 is not smaller than 200 (L=200), processing transfers to step S405.

At step S403, it is checked whether or not the value of the channel constituting data is 1. If the value of the channel constituting data is 1, processing transfers to step S404 and, if otherwise, to step S405.

At step S404, since the mode is the stereo mode, a control signals 220h for decoding the signal (L+R)/2 and the signal (L−R)/2 is generated and sent to the respective components. At step S405, since the mode is the monaural mode, a control signal 220h for decoding the signal (L+R)/2 is generated and sent to the respective components.

If the above-mentioned channel constituting data are omitted, and the data quantity of the codestring of the signal encoded by the encoding method of the A-codec is smaller than the data quantity in the frame, codes of other channels encoded by the B-codec may be prescribed to be contained. By so doing, the data quantity for the channel constituting data can be allocated to encoding of actual signals. In this case, however, if only the channel encoded by the A-codec encoding method is recorded, the data quantity needs to be brought into coincidence with the data amount allocated to the frame, or the signals of other channel encoded by the B-codec encoding method need to be substantially silent data.

Figure 29:
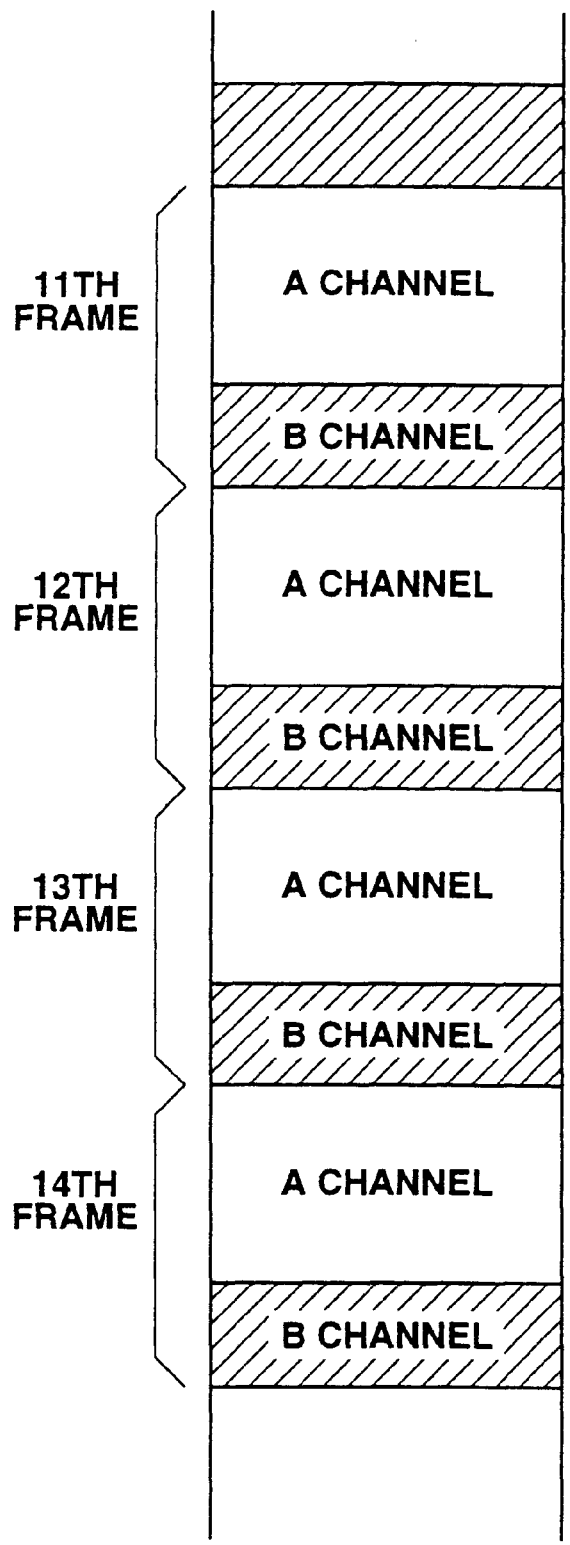
FIG. 29 illustrates the structure of a codestring in which the channel constituting data are not arranged in a frame.

FIG. 29 show the structure of a codestring in case the channel constituting data are omitted, as described above.

If the codestring shown in FIG. 29 is used, the same structure of the encoding circuit as that shown in FIG. 25 can be used, while the same decoding circuit as that shown in FIG. 27 can be used.

Figure 30:
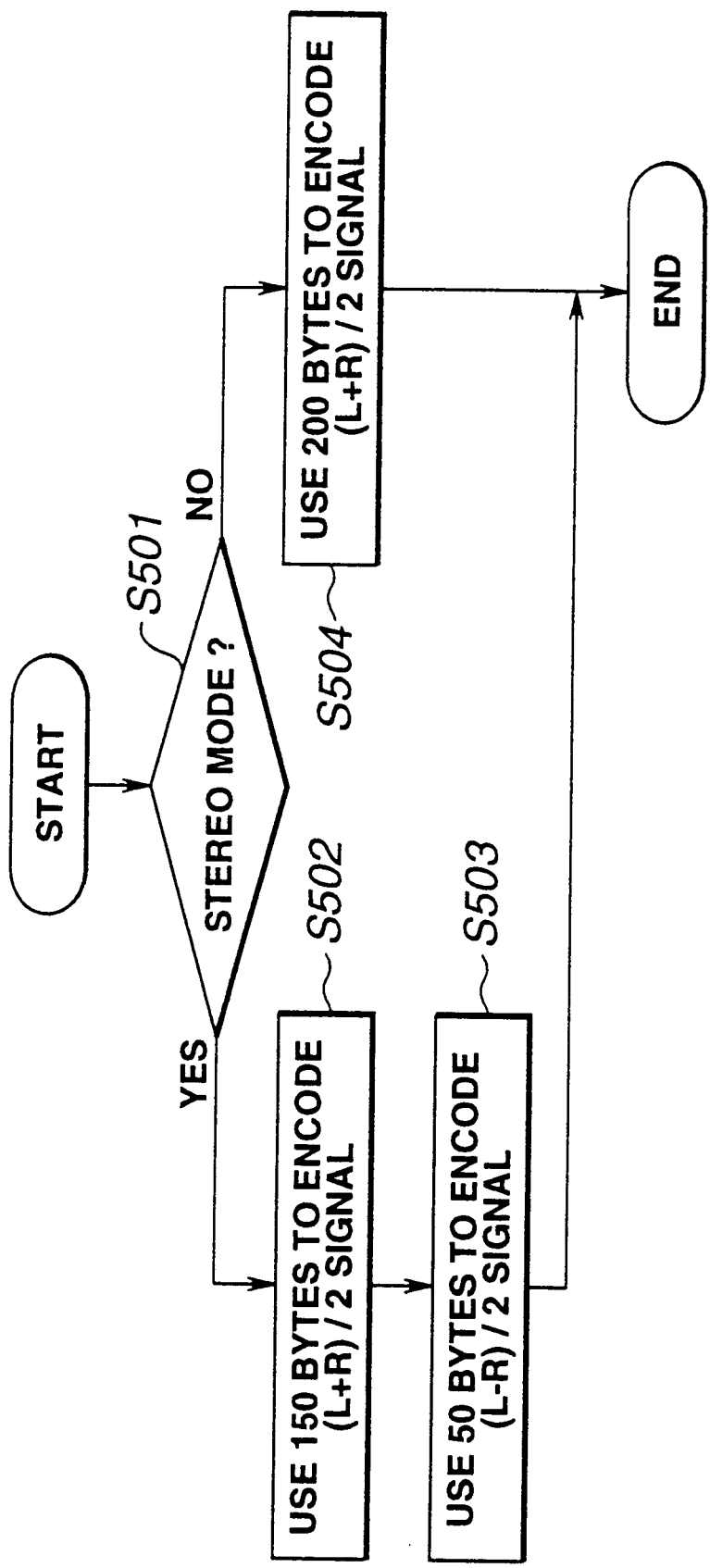
FIG. 30 is a flowchart for illustrating a processing example of a signal component encoding circuit configured for generating a codestring in which channel constituting data are not arranged in a frame.

FIG. 30 shows a flowchart for the processing example of generating the codestring shown in FIG. 29.

In FIG. 30, it is checked at step S501 whether or not the recording/reproduction is to be in stereo as described above. Of the mode designating signal 210f indicates the stereo mode, processing transfers to step S502 ff and, if otherwise, to step S504.

At step S502, 150 bytes are used for encoding the signal (L+R)/2 by the A-codec. At the next step S503, 50 bytes are used to encode the (L−R) by the B-codec.

At step S504, 200 bytes are used to encode the (L+R)/2 by the A-codec.

Figure 31:
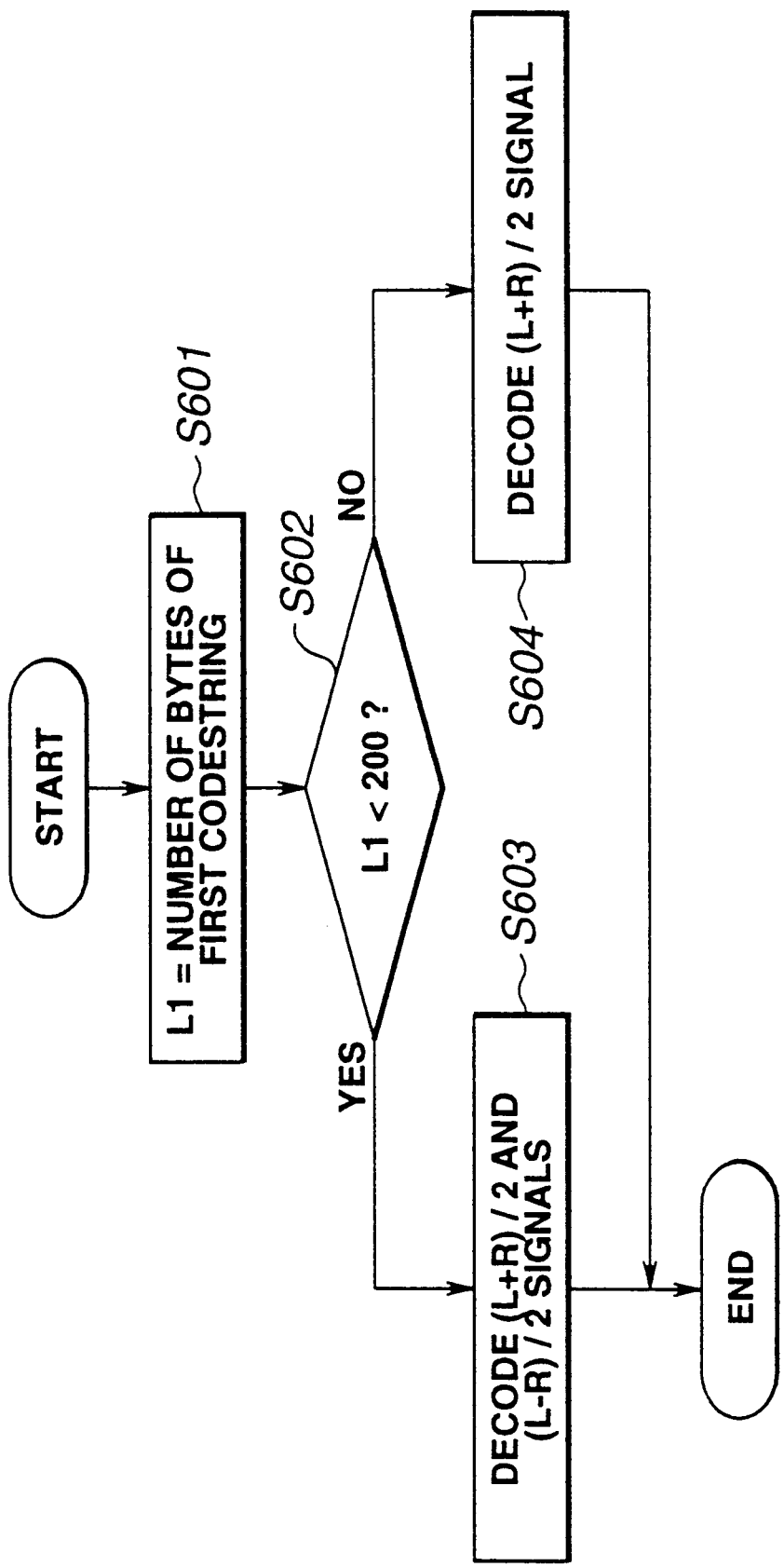
FIG. 31 is a flowchart for illustrating a processing example of a signal component decoding circuit configured for decoding a codestring in which channel constituting data are not arranged in a frame.

FIG. 31 shows a flowchart of an illustrative processing when decoding the codestring of FIG. 29.

In FIG. 31, the number of bytes L1 of the first codestring 220a, that is the codestring signal (L+R)/2 220b, is found at step S601 by calculations. At step S602, it is checked whether or not the number of bytes L1 is smaller than 200. If L1 is smaller than 200, processing transfers to step S403 et seq., whereas, if L1 is not smaller than 200(L=200), processing transfers to step S604.

At step S603, since the mode is the stereo mode, the signal (L+R)/2 and the signal (LR)/2 are decoded. At step S604, since the mode is the monaural mode, the signal (L+R)/2 is decoded.

In the foregoing, the signal (L+R)/2 is encoded by the A-codec, while the signal (L−R)/2 is encoded by the B-codec. It can be easily understood that, if the signal (L+R)/2 is encoded by the A-codec encoding method, and the L-channel signals are encoded by the B-codec encoding method, the decoding circuit can be constructed so that monaural reproduction and stereo reproduction can be realized by the old standard accommodating reproducing device and the new standard accommodating reproducing device, respectively. That is, the new standard accommodating reproducing device can generate R-channel signals by subtracting the L signals from the signal corresponding to the signal (L+R)/2 multiplied by 2, thereby producing both the L and R channels.

It is seen from above that the encoding method and device, decoding method and device and a recording medium having the encoded signal recorded thereon, in which a small number of channels can be reproduced by the old standard accommodating reproducing device and a larger number of channels can be reproduced by the new standard accommodating reproducing device, are comprised within the scope of the inventive method.

Also, as an A-codec encoding method, there is used such a method in which the entire signals are split into two bands and orthogonally transformed to produce spectral coefficients which arc then normalized and quantized so as to be then encoded with fixed length coding. On the other hand, as a B-codec encoding method, there is used such a method in which the entire signals are split into two bands and orthogonal transformed to produce spectral coefficients, which are then separated into tonal and other components and subsequently encoded with variable length coding. Encoding methods other than those described above may be used. For example, such an A-codec encoding method may be used in which time-domain signals obtained on band splitting followed by sub-sampling, depending on the bandwidths, are normalized and quantized so as to be then encoded by fixed length coding, whilst such a B-codec encoding method may be used in which the time-domain signals of the entire range are orthogonally transformed to produce spectral coefficients which are then normalized, quantized and encoded. As the B-codec encoding method, it is desirable to reduce the deterioration in sound quality in case of reproduction by the old standard accommodating reproducing device by using a technique which realized an optimum encoding efficiency.

In the above-described embodiments, audio signals are used as an example. The inventive method can, however, be used if the signals reproduced by the old standard accommodating reproducing device are video signals. That is, if the luminance signals are encoded as an old standard codestring, the inventive method can be used for adding chroma signals or color hue signals to the codestring. The channel in the present invention is meant to be comprised of luminance signals, chroma signals or color hue signals if the signals are video signals.

Although the foregoing description has been made in connection with recording an encoded bitstream on a recording medium, the inventive method may also be applied to transmission of a bitstream.

As the recording medium, not only the recording mediums, such as an optical disc, but also a random-accessible semiconductor memory, may also be used.

What is claimed is:

1. An information encoding method for encoding a plurality of channels, the method comprising:
    encoding signals of a channel in the plurality of channels by a first encoding method for generating first codestrings;
    encoding signals of the remaining channels by a second encoding method for generating second codestrings; and
    packing said first codestrings and said second codestrings into every frame or every plurality of frames, each frame being of a fixed size,
    wherein said first encoding method is an encoding method different from said second encoding method.

2. The information encoding method as claimed in claim 1 wherein
    each first codestring is such a codestring containing the substantial bit rate decision information for encoding.

3. The information encoding method as claimed in claim 1, wherein
    said second encoding method splits time-domain signals of the remaining channels into transform blocks having a pre-set time width, transforms the signal in the blocks into spectral signal components, and
    encodes the spectral signal components.

4. The information encoding method as claimed in claim 3, wherein
    said first encoding method splits time-domain signals of the channel into transform blocks having another pre-set time width which is shorter than the transform block length in said second encoding method, transforms the signal in the blocks into spectral signal components and encodes the spectral signal components.

5. The information encoding method as claimed in claim 1 wherein said second encoding method encodes channel signals by variable length coding.

6. The information encoding method as claimed in claim 1, wherein
    said second encoding method separates channel signals into tonal components having a concentrated energy and non-tonal components not having a concentrated energy.

7. The information encoding method as claimed in claim 1 wherein the allocated bit rate per channel for the first encoding method differs from the allocated bit rate per channel for the second encoding method.

8. The information encoding method as claimed in claim 1, wherein
    the first encoding method splits time-domain signals of the channel into blocks having a pre-set time width, transforms the signal in the blocks into spectral signal components and
    encodes quantized spectral signal components by fixed length coding on each encoding unit.

9. The information encoding method as claimed in claim 8 wherein the number of said encoding units is also encoded.

10. The information encoding method as claimed in claim 1 wherein the arraying direction of said first codestrings arranged from one or more frame(s) of a fixed size to another is reversed from the arraying direction of said second codestrings.

11. The information encoding method as claimed in claim 1 wherein there is also arrayed the information also specifying the presence of said second codestring.

12. An information encoding apparatus for encoding a plurality of channels, the apparatus comprising:
    first encoding means for encoding signals of a channel in the plurality of channels by a first encoding method for generating first codestrings;
    second encoding means for encoding signals of the remaining channels by a second encoding method for generating second codestrings; and
    codestring packing means for packing said first codestrings and said second codestrings into every frame or every plurality of frames, each frame being of a fixed size,
    wherein said first encoding method is an encoding method different from said second encoding method.

13. The information encoding apparatus as claimed in claim 12 wherein
    each first codestring is such a codestring containing the substantial bit rate decision information for encoding.

14. The information encoding apparatus as claimed in claim 12 wherein said second encoding means comprises:
    transform means for splitting time-domain signals of the remaining channels into transform blocks with pre-set time widths, and for transforming the signals in the transform blocks into spectral signal components;
    signal component encoding means for encoding said spectral signal components; and
    codestring generating means for generating said second codestrings from the encoded spectral signal components.

15. The information encoding method as claimed in claim 14 wherein said first encoding means has
    transform means for splitting time-domain channel signals in terms of spectral signal components shorter than the transform block length in said second encoding method as a unit for transforming the channel signals into spectral signal components;
    signal component encoding means for encoding said spectral signal components; and
    code string generating means for generating said first codestrings from the encoded spectral signal components.

16. The information encoding apparatus as claimed in claim 12 wherein said second encoding means encodes channel signals by variable length coding.

17. The information encoding apparatus as claimed in claim 12, wherein said second encoding means comprises:
    tonal component separating means for separating the channel signals into tonal components having a concentrated energy and non-tonal components not having a concentrated energy;
    tonal component encoding means for encoding said tonal components;
    non-tonal component encoding means for encoding said non-tonal components; and
    codestring generating means for generating said second codestring from the encoded tonal and non-tonal components.

18. The information encoding apparatus as claimed in claim 12 wherein the allocated bit rate per channel for the first encoding means differs from the allocated bit rate per channel for the second encoding means.

19. The information encoding apparatus as claimed in claim 12, wherein the first encoding means comprises:
    transform means for splitting time-domain signals of the channel into transform blocks having a pre-set time width, and for transforming the signals in the blocks into spectral signal components;
    signal component encoding means for encoding quantized spectral signal components by fixed length coding; and
    codestring generating means for generating said first codestrings from the encoded spectral signal components.

20. The information encoding apparatus as claimed in claim 19 wherein the signal component encoding means of said first encoding means also encodes the number of said encoding units.

21. The information encoding apparatus as claimed in claim 12 wherein said codestring arraying means reverses the arraying direction of said first codestrings arranged in each of one or more frame(s) of a fixed size from the arraying direction of said second codestrings.

22. The information encoding apparatus as claimed in claim 12 wherein there is also arrayed the information also specifying the presence of said second codestring.

23. An information decoding method, comprising:
    separating the encoded information formed by first and second codestrings into the first codestrings and the second codestrings,
    said first codestrings being signals of a channel in a plurality of channels encoded by a first encoding method for each of one or more frames of a fixed size and said second codestrings being signals of the remaining channels encoded by a second encoding method;
    decoding the separated first codestring by a first decoding method associated with said first encoding method for generating first decoded signals; and
    decoding the separated second codestring by a second decoding method associated with said second encoding method for generating second decoded signals,
        wherein said first decoding method is a decoding method different from said second decoding method.

24. The information decoding method as claimed in claim 23 wherein
    each first codestring is such a codestring containing the substantial bit rate decision information for encoding.

25. The information decoding method as claimed in claim 23, wherein said second decoding method comprises:
    restoring spectral signal components by decoding said second codestrings obtained on transforming time-domain signals of the remaining channels into spectral signal components and encoding the spectral signal components; and
    transforming the spectral signal components into time-domain signals and synthesizing the resulting signals.

26. The information decoding method as claimed in claim 25, wherein said first decoding method comprises:
    restoring spectral signal components by decoding said first codestrings obtained on transforming time-domain signals of the channel into spectral signal components with a transform block length which is shorter than the transform block length in said second encoding method; and
    transforming the spectral signal components into time-domain signals and synthesizing the resulting signals.

27. The information decoding method as claimed in claim 23 wherein said second decoding method decodes said second codestring having variable-length encoded channel signals.

28. The information decoding method as claimed in claim 23, wherein said second decoding method decodes said second codestring having channel signals separated into tonal components having a concentrated energy and non-tonal components not having a concentrated energy and encoded in this separated state.

29. The information decoding method as claimed in claim 23 wherein said first decoding method decodes said first codestring for restoring spectral signal components, said first codestring being obtained by transforming time-domain channel signals in terms of transform blocks of a pre-set time width into spectral signal components and by encoding quantized data of said spectral signal components by fixed length coding in terms of an encoding unit of a pre-set length as a unit;
    said first decoding method transforming said spectral signal components into transform-block-based time-domain signals and synthesizing the resulting signals.

30. The information decoding method as claimed in claim 29 wherein the encoded number of encoding units is decoded to do decoding based on said number of encoding units.

31. The information decoding method as claimed in claim 23 wherein said first codestrings and the second codestrings are separated from the encoded information in which said first codestrings are arrayed in a reverse arraying direction from the arraying direction of said second codestrings.

32. The information decoding method as claimed in claim 23 wherein the information specifying the presence of said second codestring is separated from said encoded information in order to do decoding of the second codestring based on said separated information.

33. The information decoding method as claimed in claim 32, wherein
    the number of bits of said first codestrings is found from the encoded information and wherein
    the information specifying the presence of said second codestring is separated from said encoded information if the number of bits of said first codestrings is less than a pre-set value.

34. The information decoding method as claimed in claim 23, wherein
    the number of bits of said first codestrings is found from the encoded information and wherein
    said second codestrings are separated from said encoded information and decoded if the number of bits of said first codestrings is less than a pre-set value.

35. An information decoding apparatus, comprising:

codestring separating means for separating the encoded information formed by first and second codestrings into the first codestrings and the second codestrings, said fist codestrings being signals of a channel in a plurality of channels encoded by a first encoding method for each of one or more frames of a fixed size and said second codestrings being signals of the remaining channels encoded by a second encoding method;

first decoding means for decoding the separated first codestring by a first decoding method associated with said first encoding method for generating first decoded signals; and second decoding means for decoding the separated second codestring by a second decoding method associated with said second encoding method for generating second decoded signals, wherein said first decoding method is a decoding method different from said second decoding method.

36. The information decoding apparatus as claimed in claim 35 wherein each first codestring is such a codestring containing the substantial bit rate decision information for encoding.

37. The information decoding apparatus as claimed in claim 35, wherein said second decoding means comprises:

signal component restoring means for restoring spectral signal components by decoding said second codestrings obtained on transforming time-domain signals of the remaining channels into spectral signal components and encoding the spectral signal components;

transforming means for transforming the spectral signal components into time-domain signals; and synthesizing means for synthesizing the resulting signals.

38. The information decoding apparatus as claimed in claim 37, wherein said first decoding means comprises:

signal component restoring means for restoring spectral signal components by decoding said first codestrings obtained on transforming time-domain signals of the channel into spectral signal components with a transform block length which is shorter than the transform block length in said second encoding method;

transforming means for transforming the spectral signal components into time-domain signals; and synthesizing means for synthesizing the resulting signals.

39. The information decoding apparatus as claimed in claim 35 wherein said second decoding means decodes said second codestrings in which channel signals have been encoded by variable length coding.

40. The information decoding apparatus as claimed in claim 35, wherein said second decoding means comprises:

tonal component separating means for separating encoded tonal components having a concentrated energy and non-tonal components not having a concentrated energy from said second codestrings made up of said encoded tonal components and non-tonal components;

tonal component decoding means for decoding the separated and encoded tonal components;

non-tonal component decoding means for decoding the separated and encoded non-tonal components; and component synthesizing means for synthesizing said decoded tonal and non-tonal components.

41. The information decoding apparatus as claimed in claim 35 wherein said first decoding means includes signal component decoding means for decoding said first codestring for restoring spectral signal components, said first codestring being obtained by transforming time-domain channel signals in terms of transform blocks of a pre-set time width into spectral signal components and by encoding quantized data of said spectral signal components by fixed length coding in terms of an encoding unit of a pre-set length as a unit;

transforming means for transforming said spectral signal components into transform-block-based time-domain signals; and synthesizing means for synthesizing the transform-block-based time-domain signals.

42. The information decoding apparatus as claimed in claim 41 wherein said first decoding means also decodes the encoded number of encoding units to do decoding based on the number of encoding units.

43. The information decoding apparatus as claimed in claim 35 wherein said codestring separating means separates first and second codestrings from the encoded information in which said first codestrings are arrayed in an opposite arraying direction to the arraying direction of said second codestrings.

44. The information decoding apparatus as claimed in claim 35 wherein said codestring separating means separates the information specifying the presence of said second codestring from the encoded information, said second decoding means decoding said second codestring based on the information specifying the presence of said second codestring.

45. The information decoding apparatus as claimed in claim 44, wherein said codestring separating means finds the number of bits of said first codestrings from the encoded information and wherein the information specifying the presence of said second codestring is separated from said encoded information if the number of bits of said first codestrings is less than a pre-set value.

46. The information decoding apparatus as claimed in claim 35, wherein said codestring separating means finds the number of bits of said first codestrings from the encoded information and wherein said second codestrings are separated from said encoded information and decoded if the number of bits of said first codestrinqs is less than a pre-set value.

47. An information recording medium having recorded thereon encoding parameters along with encoded information formed by first and second codestrings, said first codestrings being signals of a channel in a plurality of channels encoded by a first encoding method for each of one or more frames of a fixed size and said second codestrings being signals of the remaining channels encoded by a second encoding method, wherein said first encoding method is an encoding method different from said second encoding method.

* * * * *